United States Patent
Zhang et al.

(10) Patent No.: US 7,514,913 B2
(45) Date of Patent: *Apr. 7, 2009

(54) PARALLEL CURRENT MODE CONTROL USING A DIRECT DUTY CYCLE ALGORITHM WITH LOW COMPUTATIONAL REQUIREMENTS TO PERFORM POWER FACTOR CORRECTION

(75) Inventors: Wanfeng Zhang, Kingston (CA); Yan-Fei Liu, Kingston (CA); Bin Wu, Toronto (CA)

(73) Assignee: iWatt Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/951,228

(22) Filed: Dec. 5, 2007

(65) Prior Publication Data

US 2008/0122422 A1 May 29, 2008

Related U.S. Application Data

(62) Division of application No. 10/859,995, filed on Jun. 4, 2004, now Pat. No. 7,317,625.

(51) Int. Cl.
G05F 5/00 (2006.01)
G05F 1/62 (2006.01)

(52) U.S. Cl. .................. 323/299; 323/283; 323/285; 323/222

(58) Field of Classification Search .............. 363/61, 363/81, 89–90; 323/207, 222, 283, 285, 323/211, 299, 259, 223
See application file for complete search history.

(56) References Cited

U.S. PATENT DOCUMENTS

| | | | |
|---|---|---|---|
| 3,769,568 A | 10/1973 | Hamilton et al. | |
| 4,326,245 A | 4/1982 | Saleh | |
| 4,521,672 A | 6/1985 | Fronius | |
| 4,761,725 A | 8/1988 | Henze | |
| 4,823,070 A | 4/1989 | Nelson | |
| 5,134,355 A | 7/1992 | Hastings | |
| 5,138,543 A | 8/1992 | Harm et al. | |
| 5,305,192 A | 4/1994 | Bonte et al. | |

(Continued)

OTHER PUBLICATIONS

"AND8124/D—90W, Universal Input, Single Stage, PFC Converter," On Semiconductor Components Industries LLC, Dec. 2003, pp. 1-10, [online] [retrieved on Jan. 26, 2004]. Retrieved from the Internet: <URL: http://www.onsemiconductor.com/pub/Collateral/AND8124-D.pdf>.

(Continued)

Primary Examiner—Akm E Ullah
Assistant Examiner—Harry Behm
(74) Attorney, Agent, or Firm—Fenwick & West LLP

(57) ABSTRACT

A method and apparatus to implement parallel current mode control that is suitable for digital and analog implementation. A duty cycle algorithm is composed of a voltage term and a parallel current term which depends on the inductor current change between the inductor current value at the beginning of a switching cycle and the reference inductor current value at the end of that switching cycle. Parallel current mode control can be applied to all DC-DC converters, including both non-isolated and isolated topologies. It can also be applied to AC-DC converters with power factor correction.

33 Claims, 13 Drawing Sheets

U.S. PATENT DOCUMENTS

| | | | |
|---|---|---|---|
| 5,325,282 | A | 6/1994 | Bansard |
| 5,359,276 | A | 10/1994 | Mammano |
| 5,438,499 | A | 8/1995 | Bonte et al. |
| 5,631,550 | A | 5/1997 | Castro |
| 5,638,265 | A | 6/1997 | Gabor |
| 5,751,561 | A | 5/1998 | Ho et al. |
| 5,757,626 | A | 5/1998 | Jovanovic et al. |
| 5,841,643 | A | 11/1998 | Schenkel |
| 5,867,379 | A | 2/1999 | Maksimovic et al. |
| 5,912,549 | A | 6/1999 | Farrington et al. |
| 5,991,172 | A | 11/1999 | Jovanovic et al. |
| 6,038,146 | A | 3/2000 | Luo et al. |
| 6,043,633 | A | 3/2000 | Lev |
| 6,069,804 | A | 5/2000 | Ingman et al. |
| 6,140,777 | A | 10/2000 | Wang |
| 6,191,676 | B1 | 2/2001 | Gabor |
| 6,191,965 | B1 | 2/2001 | Matsumoto |
| 6,215,288 | B1 | 4/2001 | Ramsey et al. |
| 6,275,018 | B1 | 8/2001 | Telefus et al. |
| 6,304,473 | B1 | 10/2001 | Telefus et al. |
| 6,324,079 | B1 | 11/2001 | Collmeyer et al. |
| 6,366,066 | B1 | 4/2002 | Wilcox |
| 6,370,039 | B1 | 4/2002 | Telefus |
| 6,381,150 | B2 | 4/2002 | Telefus |
| 6,385,059 | B1 | 5/2002 | Telefus et al. |
| 6,388,429 | B1 | 5/2002 | Mao |
| 6,396,722 | B2 | 5/2002 | Lin |
| 6,404,173 | B1 | 6/2002 | Telefus |
| 6,430,063 | B1 | 8/2002 | Nishimura et al. |
| 6,434,021 | B1 | 8/2002 | Collmeyer et al. |
| 6,448,745 | B1 | 9/2002 | Killat |
| 6,621,255 | B2 | 9/2003 | Telefus |
| 6,657,417 | B1 | 12/2003 | Hwang |
| 6,906,503 | B2 | 6/2005 | Lopez-Santillana et al. |
| 6,944,034 | B1 | 9/2005 | Shteynberg et al. |
| 7,317,625 | B2 * | 1/2008 | Zhang et al. .................. 363/89 |
| 2007/0236201 | A1 * | 10/2007 | Brown ....................... 323/284 |

OTHER PUBLICATIONS

Bibian, S., et al., "Digital Control with Improved Performance for Boost Power Factor Correction Circuits," 16th IEEE, Mar. 4, 2001, p. 137-143.

Chen, J., et al., "Predictive Digital Current Programmed Control," IEEE Transaction on power Electronics, Jan. 2003, p. 411-419, vol. 18, No. 1.

Dixon, L., "High Power Factor Preregulator Off-line Power Supplies", Unitrode Corporation (Texas Instruments) Power Supply Design Seminar Topics SEM600, 1988, pp. 6-1-6-16, [online] [retrieved on Mar. 1, 2005] Retrieved from the Internet: <URL:http://focus.ti.com/docs/training/catalog/events/event.jhtml?sku=SEM4010058section=Dates>.

Erickson, R., et al., "Design of a Simple High-Power-Factor Rectifier Based on the Flyback Converter," Proceedings of IEEE Applied Power Electronics Conference, Mar. 1990, pp. 792-801.

"Linear Technology LT1103/LT1105 Offline Switching Regulator," Linear Technology Corporation, 1992, pp. 1-32, [online] [retrieved on Apr. 12, 2004] Retrieved from the Internet: <URL: http://www.linear.com/pdf/11035fd.pdf>.

"Linear Technology LT1725 General Purpose Isolated Flyback Controller," Linear Technology Corporation, 2000, pp. 1-28, [online] [retrieved on Apr. 12, 2004] Retrieved from the Internet: <URL: http://www.linear.com/pdf/1725fd.pdf>.

Murphy, P. et al., "Digital Control of Power Factor Correction", Department of Electrical and Computer Engineering, NC A&T State University; Virginia Tech, CPES Seminar 2003, pp. 341-347, Apr. 27-29, 2003, Blacksburg, VA.

"NCP1651—Single Stage Power Factor Control," Semiconductor Components Industries, LLC, Oct. 2003, pp. 1-32, Rev. 5, [online] [retrieved on Jan. 26, 2004]. Retrieved from the Internet: <URL: http://www.onsemiconductor.com/pub/Collateral/NCP1651-D.pdf>.

"NCP 1651 Product Review, Single Stage Power Factor Controller," Semiconductor Components Industries, LLC, Apr. 2002, pp. 1-28, Rev. 1.

"Unitrode UC1854, UC2854, UC3854 High Power Factor Preregulator," Texas Instruments, Incorporated, 1999.

Zhang, W., et al., "A New Predictive Control Strategy for Power Factor Correction," 18th IEEE, Applied Power Electronics Conference and Exposition, Feb. 9-13, 2003, p. 403-409, vol. 1.

Zhang, W., et al., "A New Power Factor Correction (PFC) Control Method Suitable for Low Cost DSP," IEEE, International Telecommunications Energy Conference, Sep. 29-Oct. 3, 2002, p. 407-414.

Zhang, W., et al., "Analysis and Implementation of a New PFC Digital Control Method," IEEE Power Elect. Conf., Mexico, Jun. 15-19, 2003, p. 335-341, vol. 1.

Zhang, W., et al., "DSP implementation of Predictive Control Strategy for power Factor Correction (PFC)," IEEE, International Telecommunications Energy Conference, Sep. 29-Oct. 3, 2002, p. 407-414.

* cited by examiner

PARALLEL CURRENT MODE CONTROL USING A DIRECT DUTY CYCLE ALGORITHM WITH LOW COMPUTATIONAL REQUIREMENTS TO PERFORM POWER FACTOR CORRECTION

CROSS REFERENCE TO RELATED APPLICATION

This application is a divisional application under 35 U.S.C. §121 of, and claims priority 35 U.S.C. §120 to co-pending U.S. patent application Ser. No. 10/859,995 entitled "Parallel Current Mode Control Using a Direct Duty Cycle Algorithm with Low Computational Requirements to Perform Power Factor Correction" filed on Jun. 4, 2004.

FIELD OF INVENTION

This invention relates to electronic power supply converters for energy systems and more particularly to DC-DC converter and AC-DC converter with power factor correction.

BACKGROUND OF INVENTION AND PRIOR ART

Digital control is becoming more and more popular because of the process advancement of CMOS technology. In addition, the power requirement is becoming more and more complicated and the conventional analog control method can no longer meet this requirements. Digital control of power converter and power system can meet these more and more complicated power requirement. It is expected that digital control will replace analog control in switching power converters.

At the present time, the control algorithms used in digital controllers are translated directly from analog algorithms. In other words, they are digital implementation of the algorithms that are optimized for analog implementation. They are not optimized for digital implementation.

For DC-DC converter, current mode control is widely used because of its advantages. Peak current mode control, average current mode control, and hysteresis current mode control are three commonly used current mode control methods.

Current mode control can improve the dynamic performance of the DC-DC converter significantly because it utilizes the inductor current information, together with the output voltage information. Unfortunately, the conventional current mode control methods are optimized for analog implementation. It is very difficult to implement those methods using digital circuits.

Thus, there is a need for a new current mode control method that is suitable for both analog and digital implementation. It is called parallel current mode control. The parallel current mode control can be applied to both DC-DC converter and AC-DC converter with power factor correction.

There are several disadvantages in existing digital control PFC implementation systems based on conventional current mode control, such as high computational requirement, limited switching frequency and high cost. Predictive control methods are being explored and implemented in digital controlled PFC in order to take full advantage of digital techniques. One such digital current program control using a predictive algorithm was presented by Chen et al in "Predictive Digital Current programmed Control", IEEE Transactions on Power Electronics, Vol 18, No 1, January 2003, pp 411-419. In that paper, the duty cycle, d(n+1), was calculated based on the value of the present duty cycle d(n) and sensed inductor current, input voltage and output voltage. Unity power factor was achieved. The first disadvantage is that the duty cycle calculation requires the duty cycle value in the previous switching cycle. Second, the computation requirement is not obviously reduced compared to that in the digital PFC implementation based on current mode control. Bibian et al, in "Digital Control with improved performance for boost power factor correction circuits", Applied Power Electronics Conference and Exposition 2001, 16$^{th}$ Annual IEEE, pp 137-143 proposed dead-beat predictive control in which a predicted duty cycle was used to control the switch during a control period which is equivalent to several or several tens switching cycles. The duty cycles were fixed during one control period. Computation was reduced in that control method. However, the harmonics in the line current was increased compared to the control method in which the duty cycle was calculated in every switching cycle. The computation requirement in digital PFC implementations was reduced further by the techniques proposed by Zhang et al in APEC 2003, pp 403-409 and PESC 2003, pp 335-341 because all the duty cycles for a half line period were calculated in advance based on the voltage loop and the input voltage feed-forward. However, the current waveform is sensitive to the parameters of the model and the capability of the regulation to the step load change is not satisfied when the load variation is wide. Thus there is still a need for a direct duty cycle control algorithm with low calculation requirement for digital power factor correction implementation.

OBJECT OF INVENTION

One object of the present invention is to provide a method to achieve current mode control that is optimized for digital implementation. The proposed parallel current mode control can achieve this objective.

Another object of the present invention is to provide a method that is optimized for digital implementation to achieve unity power factor for AC-DC converter. The proposed PFC control method can be implemented by a low cost DSP, FPGA or ASIC due to its low computation requirement. It overcomes the disadvantages of the existing digital PFC techniques mentioned above, such as high computation requirement, model sensitivity and increased harmonics.

BRIEF STATEMENT OF INVENTION

By one aspect of this invention there is provided a method for controlling power factor under steady and transient state conditions in an AC-DC power supply converter system with power factor correction based on Boost topology, comprising:
  (a) determining input voltage ($V_{in}(n)$) and reference output voltage ($V_{ref}$) in said system,
  (b) determining reference input current ($i_{ref}(n+1)$), actual inductor current ($i_L(n)$) in said system, and
  (c) controlling a duty cycle (d(n)) in said system according to the algorithm $$d(n) = \frac{L}{T_s} \frac{i_{ref}(n+1) - i_L(n)}{V_{ref}} + \frac{V_{ref} - V_{in}(n)}{V_{ref}}$$

where L is inductor value and $T_s$ is switching period,
  so as to provide a power factor approaching unity.

By another aspect of this invention there is provided an apparatus for controlling power factor in an electronic digital AC to DC power supply converter system, comprising:

(a) voltage input means connected to a first analog to digital converter (ADC) so as to generate a first output signal which is fed to a first adder which also receives a reference output voltage signal ($V_{ref}$) so as to generate a second output signal which is used to generate a third output signal including a factor of $$\frac{1}{V_{ref}}.$$

(b) a second analog to digital converter (ADC) to receive an inductor current signal and generate a fourth output signal which is fed to a second adder which also receives an reference input current, so as to generate a fifth output signal which is used to generate a sixth output signal including a factor Kc, where $$K_C = \frac{L}{T_s \cdot V_{ref}}.$$

(c) means to feed said sixth output signal and said third output signal to a third adder so as to generate an output signal representative of a required duty cycle.

By yet another aspect of this invention there is provided a method for controlling output voltage under steady and transient state conditions in an electronic DC-DC power supply converter system based on Boost topology, and isolated Boost topology comprising:

(a) determining input voltage ($V_{in}(n)$) and reference output voltage ($V_{ref}$) in said system,
(b) determining reference input current ($i_{ref}(n+1)$), actual inductor current ($i_L(n)$) in said system, and
c) controlling a duty cycle (d(n)) in said system according to the algorithm $$d(n) = \frac{L}{T_s} \frac{i_{ref}(n+1) - i_L(n)}{N \cdot V_{ref}} + \frac{N \cdot V_{ref} - V_{in}(n)}{N \cdot V_{ref}}$$

where L is inductor value, $T_s$ is switching period, and where N is transformer turns ratio for the isolated Boost converter, N=1 for Boost converter,
so as to provide the output voltage approaching the reference output voltage.

Other aspects of this invention will become apparent from a reading of this specification and claims appended hereto.

DETAILED DESCRIPTION OF PREFERRED EMBODIMENTS

According to the present control method, the duty cycle is composed of two parallel terms. The first term is called the "voltage term". It depends on the input voltage and the desired output voltage. The expression of this term depends on the topology of the switching converters. Essentially, this term is determined by the volt-second balance of the specific converter. The second term is called the "current term" and it depends on the inductor current change between the inductor current value at the beginning of the switching cycle and the reference inductor current value at the end of that switching cycle. With this parallel current mode control method, the inductor current of the converter, such as Buck-Boost, Boost, Buck, etc., will follow the reference current with a difference gap between the reference current value and actual inductor current value. This difference gap is determined by the load condition. At the same time, the output voltage of the converter will exactly follow the reference voltage in the voltage closed loop implementation which will be elaborated in section 2. In fact, it is because the difference gap between the reference inductor current and actual inductor current that the output voltage can follow the reference voltage without error. This control philosophy essentially distinguishes from the conventional current mode control and any other control methods with two regulators (one for voltage regulation and one for current regulation) constructed serially.

The present parallel current mode control can be applied to all DC-DC converters, including both non-isolated and isolated topologies. It can also be applied to AC-DC converters with power factor correction.

Example converter topologies that may employ the parallel current mode control according to various embodiments of the present invention are described below with reference to FIGS. 4 through 4E.

Figure 4:
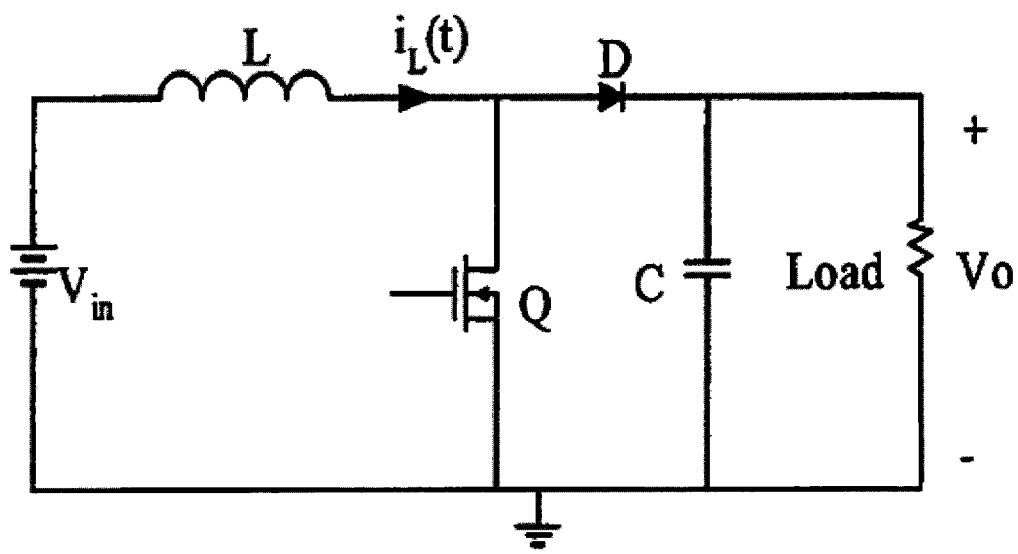
FIG. 4 is a circuit diagram of Boost converter topology.

FIG. 4 is a circuit diagram of conventional Boost converter topology. The conventional Boost converter of FIG. 4 includes an inductor L, a switch Q, a diode D, and a capacitor C. The Boost converter receives input voltage $V_{in}$ and supplies output voltage Vo to a load by Boost topology operation that is well known in the art.

Figure 4A:
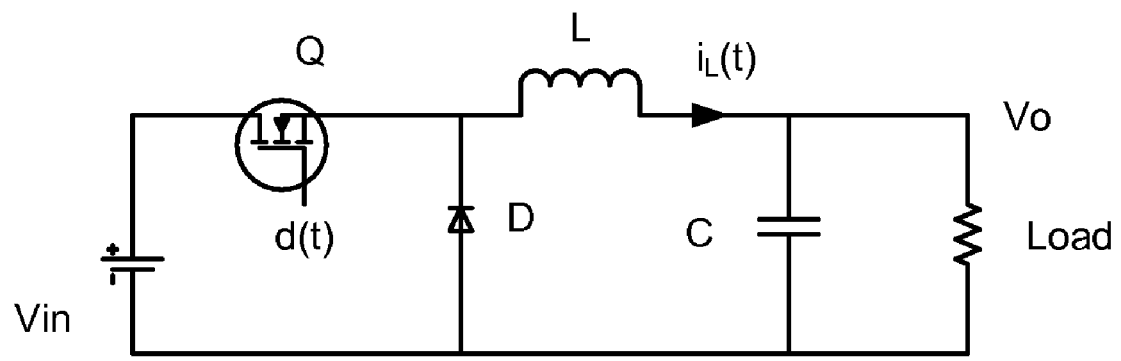
FIG. 4A is a circuit diagram of Buck converter topology.

FIG. 4A is a circuit diagram of conventional Buck converter topology. The Buck converter of FIG. 4A includes a switch Q, a diode D, an inductor L, and a capacitor C. The Buck converter of FIG. 4A receives input voltage $V_{in}$ and supplies output voltage Vo to a load by Buck topology operation that is well known in the art.

Figure 4B:
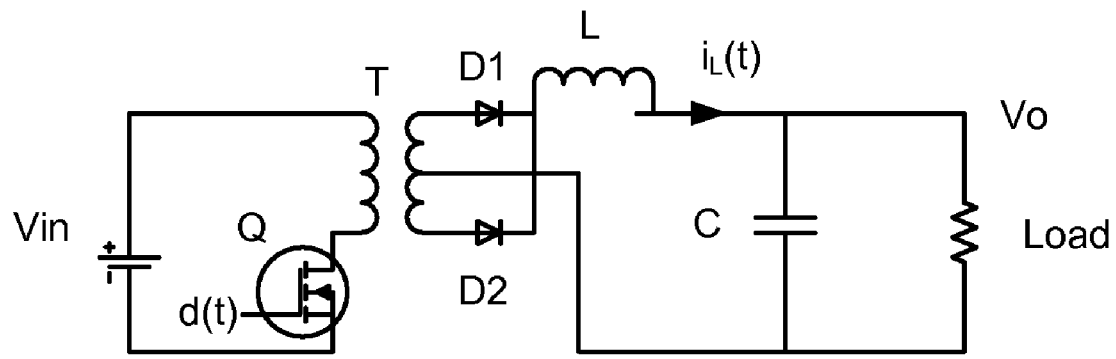
FIG. 4B is a circuit diagram of Forward converter topology.

FIG. 4B is a circuit diagram of conventional Forward converter topology. The conventional Forward converter of FIG. 4B includes a switch Q, a transformer T, two diodes D1 and D2, an inductor L and a capacitor C. The Forward converter of FIG. 4B receives input voltage $V_{in}$ and supplies output voltage Vo to a load by Forward topology operation that is well known in the art.

Figure 4C:
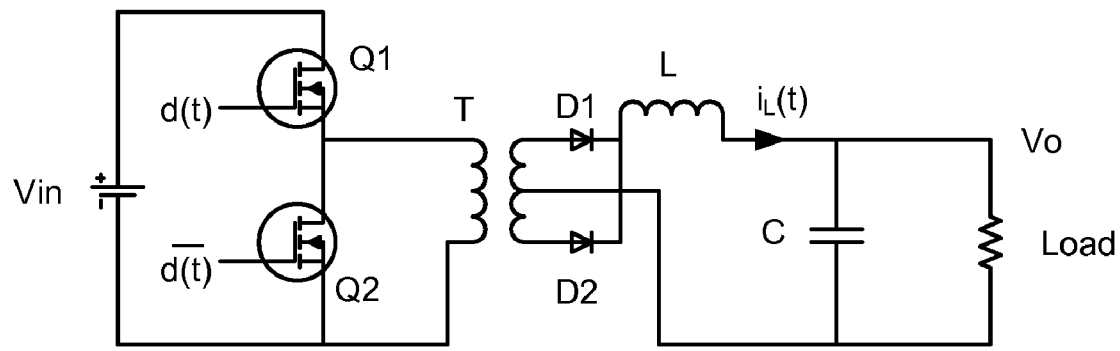
FIG. 4C is a circuit diagram of Half-Bridge converter topology.

FIG. 4C is a circuit diagram of conventional Half-Bridge converter topology. The conventional Half-Bridge converter of FIG. 4C includes two switches Q1 and Q2, a transformer T, two diodes D1 and D2, an inductor L, and a capacitor C. The Half-Bridge converter receives input voltage $V_{in}$ and supplies output voltage Vo to a load by Half-Bridge topology operation that is well known in the art.

Figure 4D:
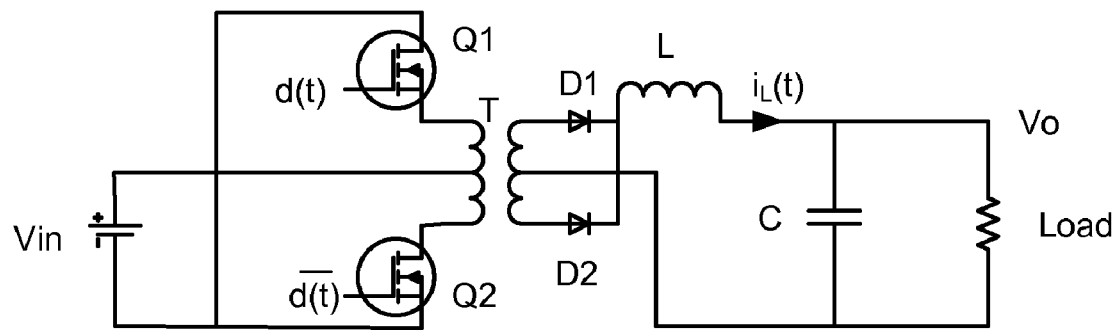
FIG. 4D is a circuit diagram of Push-Pull converter topology.

FIG. 4D is a circuit diagram of conventional Push-Pull converter topology. The conventional Push-Pull converter of FIG. 4D includes two switches Q1 and Q2, a transformer T, two diodes D1 and D2, an inductor L, and a capacitor C. The Push-Pull converter receives input voltage $V_{in}$ and supplies output voltage Vo to a load by Push-Pull topology operation that is well known in the art.

Figure 4E:
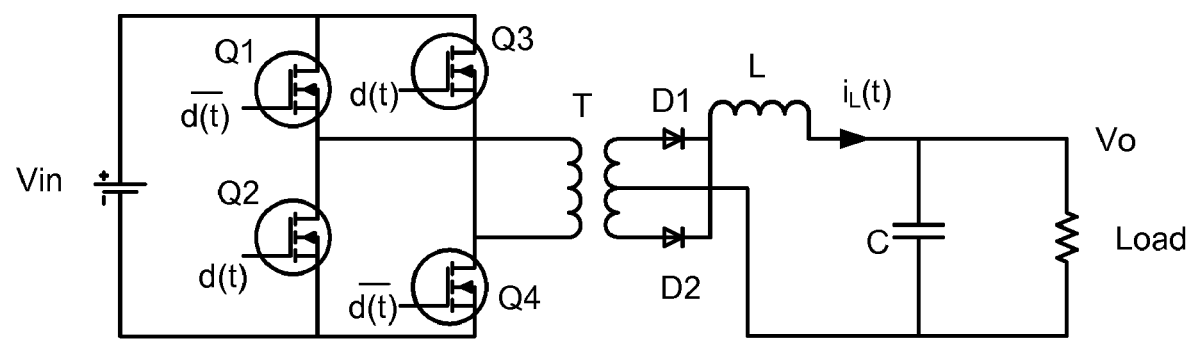
FIG. 4E is a circuit diagram of Full-Bridge converter topology.

FIG. 4E is a circuit diagram of conventional Full-Bridge converter topology. The conventional Full-Bridge converter of FIG. 4E includes four switches (Q1, Q2, Q3 and Q4), a transformer T, two diodes D1 and D2, an inductor L, and a capacitor C. The Full-Bridge converter receives input voltage $V_{in}$ and supplies output voltage Vo to a load by Full-Bridge topology operation that is well known in the art.

The present parallel current mode control is optimized for digital implementation. It can also be implemented by analog implementation.

Figure 1:
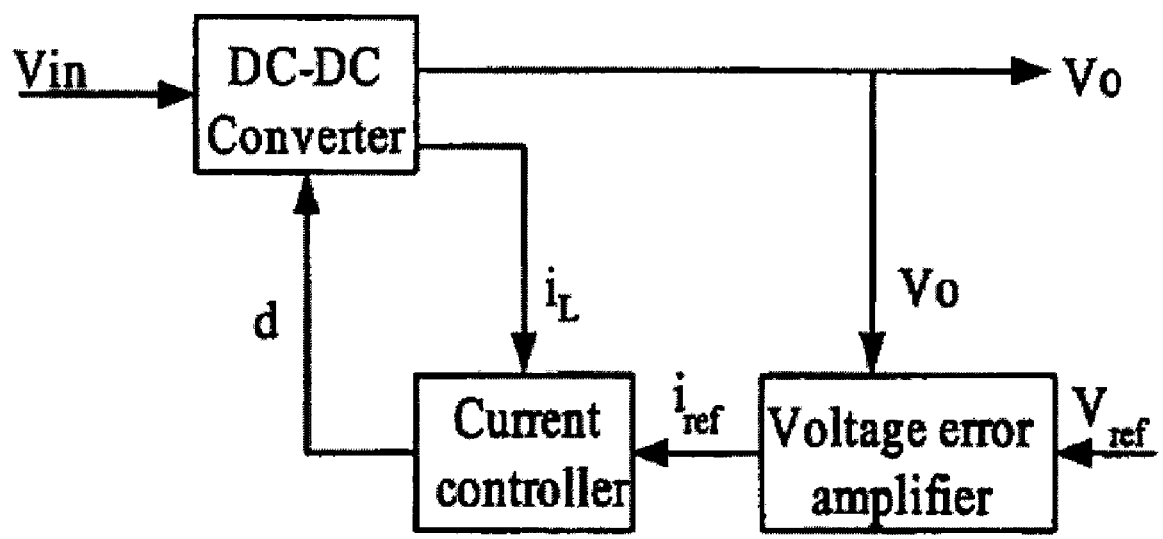
FIG. 1 is a block diagram illustrating serial current mode control.

The block diagram of the conventional current mode control is shown in FIG. 1. The output voltage is sensed and compared with the reference voltage. The output of the voltage error amplifier is used as the reference current ($i_{ref}$) for the inductor current. The current controller forces the inductor current to follow the reference current. The output of the current controller is the duty cycle that is used to turn on and turn off the switches in the DC-DC converter. In this configuration, the duty cycle is produced by the current controller only. The output voltage impacts the duty cycle indirectly, through the reference current $i_{ref}$. This can be considered as serial configuration as the duty cycle is determined solely by the current controller, which is then affected by the voltage error amplifier. Therefore, the conventional current mode control can be called as serial current mode control.

Figure 2:
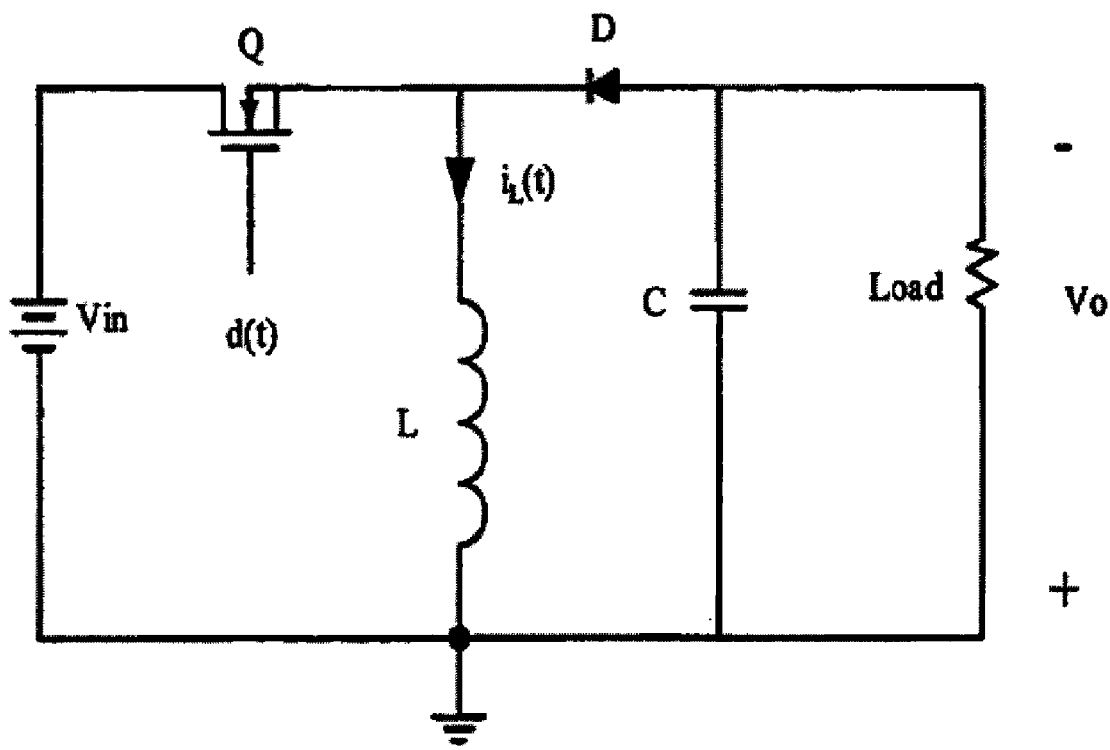
FIG. 2 is a circuit diagram for a Buck-Boost converter.

1. Basic Idea of Parallel Current Mode Control 1.1. Parallel current mode control for Buck-Boost Converter The basic idea of Parallel Current Mode Control can best be explained by using the Buck-Boost converter as an example, as shown in FIG. 2. It is assumed that the Buck-Boost converter operates at Continuous Conduction Mode (CCM). When switch Q is on, the inductor current can be expressed as:

$$L\frac{di_L}{dt} = V_{in} \quad T_s(n) \le t < T_s(n) + d(n)T_s \text{ (on time)} \quad (1)$$

When switch Q is off, the inductor current can be expressed as:

$$L\frac{di_L}{dt} = -V_o \quad T_s(n) + d(n)T_s \le t < T_s(n+1) \text{ (off time)} \quad (2)$$

It is noted that the inductor current changes linearly during the operation. Therefore, the inductor current at the beginning of the next switching period (n+1), which is the same as that at the end of the present switching period (n) can be expressed as:

$$i_L(n+1) = i_L(n) - \frac{V_o(n)\cdot T_s}{L} + \frac{(V_o + V_{in})\cdot d(n)\cdot T_s}{L} \quad (3)$$

In the above equation, $i_L(n)$ indicates the inductor current value at the beginning of the present switching period. $i_L(n+1)$ indicates the inductor current value at the beginning of the next switching period. d(n) indicates the duty cycle for switching period n. Equation (3) reveals the relation between the inductor current at the beginning of the next switching period, $i_L(n+1)$, and the inductor current at the beginning of the present witching period, $i_L(n)$, the input voltage, $V_{in}(n)$, output voltage, $V_o$, and the duty cycle for present switching period, d(n). $T_s$ is the switching period and L is the inductor value.

Equation (3) can be re-arranged as:

$$d(n) = \frac{L}{T_s}\cdot\frac{i_L(n+1) - i_L(n)}{V_{in}(n) + V_o} + \frac{V_o}{V_{in}(n) + V_o} \quad (4)$$

Equation (4) indicates that in order to force the inductor current to reach value of $i_L(n+1)$ at the beginning of next switching period, the duty cycle determined by equation (4) should be applied for the present switching period. This is a very important observation. This fact indicates one method to control the operation of the Buck-Boost converter.

It is proposed that the inductor current at the end of the switching cycle, $i_L(n+1)$ can be replaced by a reference current, $i_{ref}(n+1)$. It is also observed that under normal operating condition, the output voltage, $V_o$, is very close to the desired reference voltage, $V_{ref}$. Therefore, the term $V_o$ in equation (4) can be replaced by the reference voltage $V_{ref}$. Therefore, the duty cycle can be generated as:

$$d(n) = \frac{V_{ref}}{V_{in}(n) + V_{ref}} + \frac{L}{T_s}\cdot\frac{1}{V_{in}(n) + V_{ref}}\cdot[i_{ref}(n+1) - i_L(n)] \quad (5)$$

The above equation can be further simplified as:

$$d(n) = \text{duty}_{buck\_boost}(V) + \text{duty}_{buck\_boost}(I) \quad (6)$$

In the above equation, $$\text{duty}_{buck\_boost}(V) = \frac{V_{ref}}{V_{in}(n) + V_{ref}} \quad (7)$$

$$\text{duty}_{buck\_boost}(I) = \frac{L}{T_s}\cdot\frac{1}{V_{in}(n) + V_{ref}}\cdot[i_{ref}(n+1) - i_L(n)] \quad (8)$$

Equation (6) shows that the duty cycle for switching period n depends on two terms. One is voltage term and the other is current term. The voltage term, $duty_{buck\_boost}(V)$, depends on the input voltage and the desired output voltage, or reference voltage. The current term, $duty_{buck\_boost}(I)$, depends on the difference between the reference current at the beginning of next switching period and the inductor current at the beginning of the present period, as well as the input voltage and reference voltage.

Figure 3:
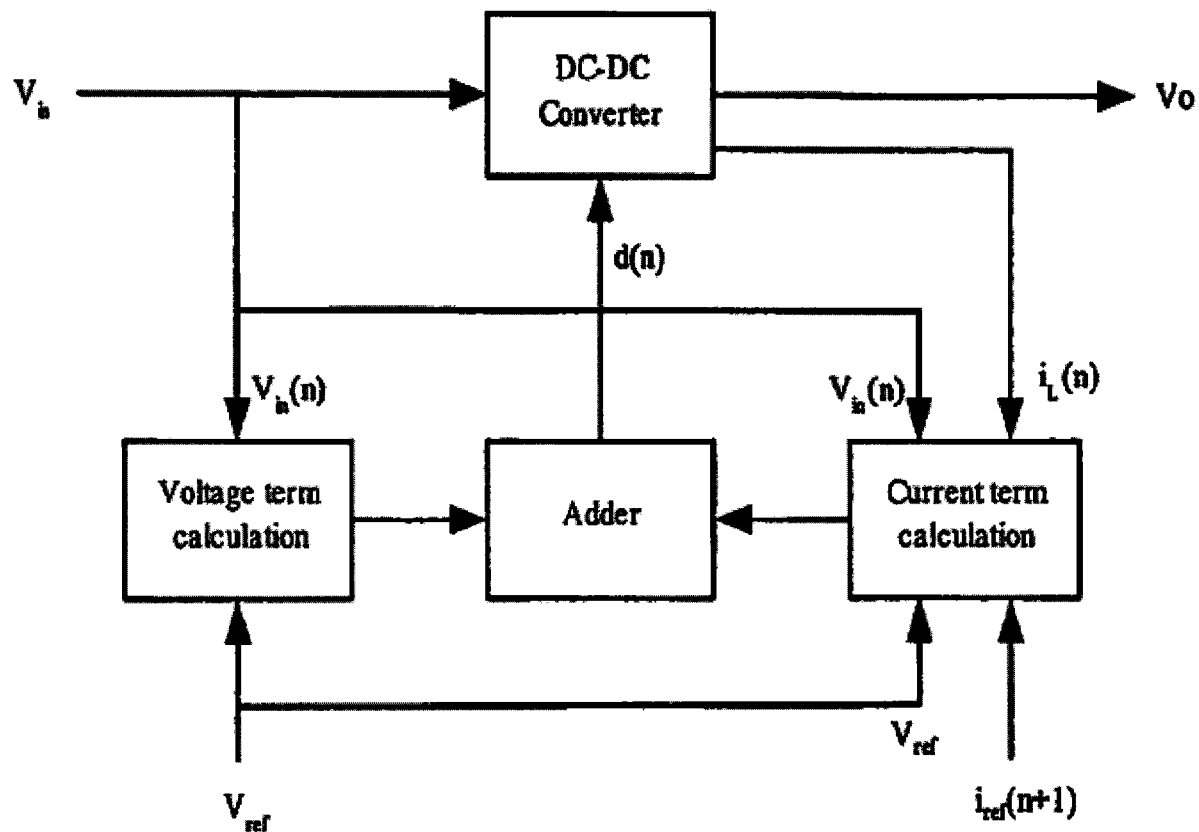
FIG. 3 is a block diagram of parallel current mode control.

FIG. 3 shows the block diagram of this control method. It is observed from the block diagram that the duty cycle is generated by two parallel loops, the loop representing the voltage term and the loop representing the current term. Therefore, this control method is called Parallel Current Mode Control.

In FIG. 3, the block DC-DC converter can be any PWM switching converters. The input voltage is sensed and fed into the block "voltage term calculation". The reference voltage is also fed into the "voltage term calculation" block, which performs the calculation for voltage term. For Buck-Boost converter, the voltage term duty cycle, is expressed by equation (7). The inductor current, $i_L(n)$, and input voltage, $V_{in}(n)$, are sensed and fed into the block "current term calculation". Reference voltage, $V_{ref}$, and reference current, $i_{ref}(n+1)$ are also fed into the "current term calculation" block, which performs the calculation for current term. For Buck-Boost converter, the current term duty cycle, is expressed by equation (8). The output of the voltage term calculation and the output of the current term calculation are added together by the adder. The output of the adder is the duty cycle signal and it is used to turn on the switch of the DC-DC converter. With parallel current mode control method, equation (5), the inductor current of the Buck-Boost converter will follow the reference current with a difference gap between the reference current value and actual inductor current value. This difference gap is determined by the load condition. At the same time, the output voltage of the Buck-Boost converter will exactly follow the reference voltage in the voltage closed loop implementation which will be elaborated in section 2.

In order to simplify the implementation, equation (6), (7) and (8) can be re-written as:

$$d(n) = \frac{duty\_V_{buck\_boost}(V) + duty\_V_{buck\_boost}(I)}{V_{in}(n) + V_{ref}} \quad (6.1)$$

$$duty\_V_{buck\_boost}(V) = V_{ref} \quad (7.1)$$

$$duty\_V_{buck\_boost}(I) = \frac{L}{T_s} \cdot [i_{ref}(n+1) - i_L(n)] \quad (8.1)$$

Based on parallel current mode control, the control algorithm for Flyback converter can be derived as:

$$d(n) = \frac{N \cdot V_{ref}}{V_{in}(n) + N \cdot V_{ref}} + \frac{L}{T_s} \cdot \frac{1}{V_{in}(n) + N \cdot V_{ref}} \cdot [i_{ref}(n+1) - i_L(n)] \quad (5.1)$$

where L is inductor value and $T_s$ is switching period, and N is transformer turns ratio which is defined as the ratio of primary turns over secondary turns. Equation (5.1) can be simplified to equation (5) when N=1.

1.2. Parallel Current Mode Control for Boost Converter

It is noted that the parallel current mode control algorithms for other switching converters can also be derived in a similar way. Another example of how to derive the parallel current mode control is given for Boost converter as shown in FIG. 4. It is assumed that the Boost converter operates at Continuous Conduction Mode (CCM). When switch Q is on, the inductor current can be expressed as:

$$L\frac{di_L}{dt} = V_{in} \quad T_s(n) \leq t < T_s(n) + d(n)T_s \text{ (on time)} \quad (9)$$

When switch Q is off, the inductor current can be expressed as:

$$L\frac{di_L}{dt} = V_{in} - V_o \quad T_s(n) + d(n)T_s \leq t < T_s(n+1) \text{ (off time)} \quad (10)$$

Therefore, the inductor current at the beginning of the next switching period (n+1), which is same as that at the end of the present switching period (n) can be expressed as:

$$i_L(n+1) = i_L(n) + \frac{V_{in}(n) \cdot T_s}{L} - \frac{V_o[1 - d(n)] \cdot T_s}{L} \quad (11)$$

The required duty cycle for switching period n can be derived as:

$$d(n) = \frac{L}{T_s} \cdot \frac{i_L(n+1) - i_L(n)}{V_o} + \frac{V_o - V_{in}(n)}{V_o} \quad (12)$$

It is proposed that the inductor current at the end of the switching cycle, $i_L(n+1)$ can be replaced by a reference current, $i_{ref}(n+1)$. It is also observed that under normal operating condition, the output voltage, $V_o$, is very close to the desired reference voltage, $V_{ref}$. Therefore, the term $V_o$ in equation (12) can be replaced by the reference voltage $V_{ref}$. Therefore, the duty cycle can be generated as:

$$d(n) = \frac{L}{T_s} \cdot \frac{i_{ref}(n+1) - i_L(n)}{V_{ref}} + \frac{V_{ref} - V_{in}(n)}{V_{ref}} \quad (13)$$

Equation (13) can be further simplified as:

$$d(n) = duty_{boost}(V) + duty_{boost}(I) \quad (14)$$

The expression for voltage term and current term in equation (14) is:

$$duty_{boost}(V) = \frac{V_{ref} - V_{in}(n)}{V_{ref}} \quad (15)$$

$$duty_{boost}(I) = \frac{L}{T_s \cdot V_{ref}} \cdot [i_{ref}(n+1) - i_L(n)] \quad (16)$$

Figure 5:
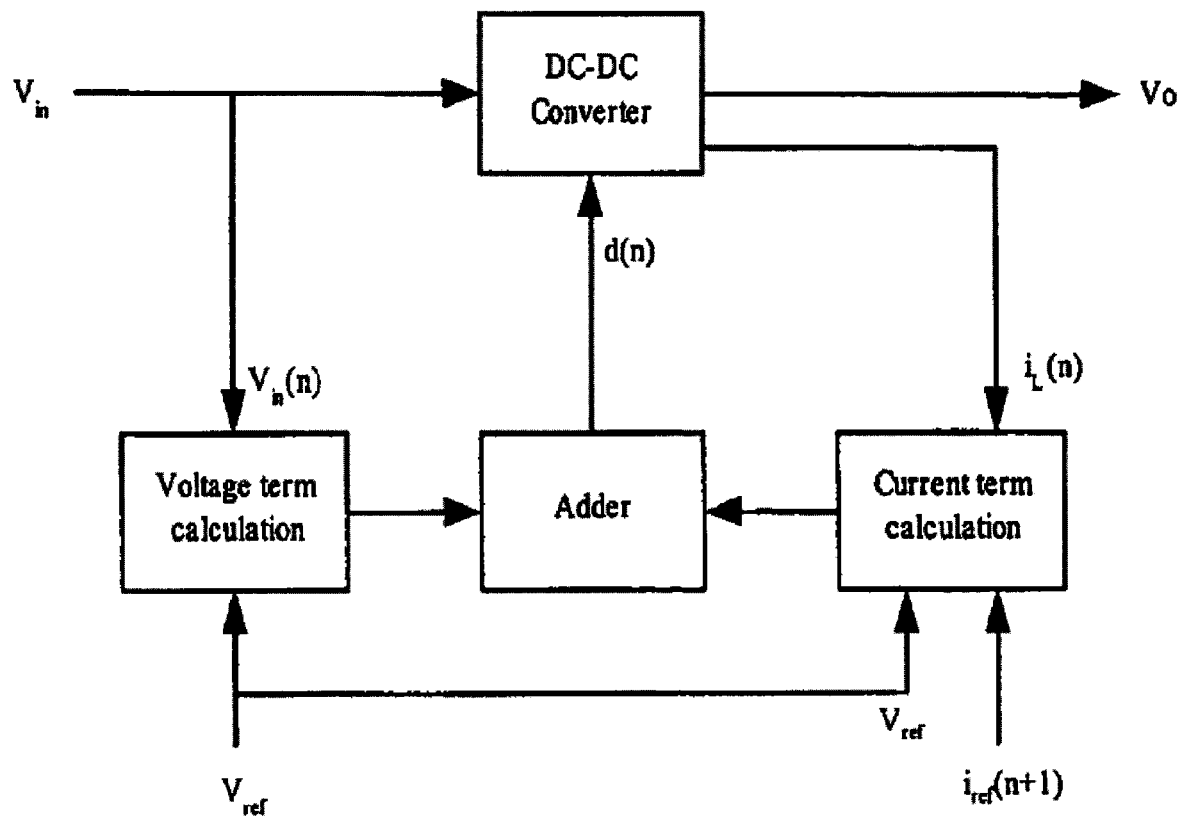
FIG. 5 is a block diagram of parallel current mode control for a Boost converter.

The block diagram for parallel current mode control for Boost converter is shown in FIG. 5. In the figure, the "voltage term calculation" block implements the calculation of equation (15) and the "current term calculation" block implements the calculation of equation (16). With this parallel current mode control method, equation (13), the inductor current of the Boost converter will follow the reference current with a difference gap between the reference current value and actual inductor current value. This difference gap is determined by the load condition. At the same time, the output voltage of the Boost converter will exactly follow the reference voltage in the voltage closed loop implementation which will be elaborated in section 2.

The difference between FIG. 3 and FIG. 5 is that the current term calculation for the Boost converter (shown in FIG. 5) does not require $V_{in}(n)$. Therefore, FIG. 3 can be considered as a more general block diagram for parallel current mode control for switching converters.

Based on parallel current mode control, the control algorithm for isolated Boost converter can be derived as:

$$d(n) = \frac{L}{T_s} \cdot \frac{i_{ref}(n+1) - i_L(n)}{N \cdot V_{ref}} + \frac{N \cdot V_{ref} - V_{in}(n)}{N \cdot V_{ref}} \quad (13.1)$$

where L is inductor value, $T_s$ is switching period, and N is transformer turns ratio which is defined as the ratio of primary turns over secondary turns. Equation (13.1) can be simplified to equation (13) when N=1.

1.3. Parallel Current Mode Control for Other DC-DC Converters

The control algorithm of parallel current mode control for Buck converter can also be derived by the same method described above and is shown in the following equations.

$$d(n) = \frac{L}{T_s} \cdot \frac{i_{ref}(n+1) - i_L(n)}{V_{in}(n)} + \frac{V_{ref}}{V_{in}(n)} \quad (17)$$

The above expression can also be separated into voltage term and current term as following:

$$d(n) = duty_{buck}(V) + duty_{buck}(I) \quad (18)$$

$$duty_{buck}(V) = \frac{V_{ref}}{V_{in}(n)} \quad (19)$$

$$duty_{buck}(I) = \frac{L}{T_s \cdot V_{in}(n)} \cdot [i_{ref}(n+1) - i_L(n)] \quad (20)$$

The implementation of the parallel current mode control for Buck converter can also be realized by FIG. 3, where the voltage term calculation block performs the calculation defined by equation (19) and the current term calculation block performs the calculation defined by equation (20). With this parallel current mode control method, equation (17), the inductor current of the Buck converter will follow the reference current with a difference gap between the reference current value and actual inductor current value. This difference gap is determined by the load condition. At the same time, the output voltage of the Boost converter will exactly follow the reference voltage in the voltage closed loop implementation which will be elaborated in section 2.

In order to simplify the implementation, equation (18), (19) and (20) can be re-written as:

$$d(n) = \frac{duty\_V_{buck}(V) + duty\_V_{buck}(I)}{V_{in}(n)} \quad (18.1)$$

$$duty\_V_{buck}(V) = V_{ref} \quad (19.1)$$

$$duty\_V_{buck}(I) = \frac{L}{T_s} \cdot [i_{ref}(n+1) - i_L(n)] \quad (20.1)$$

With this arrangement, only one divider is needed.

Based on parallel current mode control, the control algorithm for Forward, Push-Pull, Half-Bridge, Full-Bridge topologies is derived as:

$$d(n) = \frac{L}{T_s} \cdot \frac{i_{ref}(n+1) - i_L(n)}{K \cdot V_{in}(n)/N} + \frac{V_{ref}}{K \cdot V_{in}(n)/N} \quad (17.1)$$

where L is inductor value, $T_s$ is switching period, where K=1 for Forward, Push-Pull, and Full-Bridge converters and K=0.5 for Half-Bridge converter, and where N is transformer turns ratio which is defined as the ratio of primary turns over secondary turns. Equation (17.1) can be simplified to equation (17) when N=1 and K=1.

1.4. General Block Diagram of Parallel Current Mode Control

Figure 6:
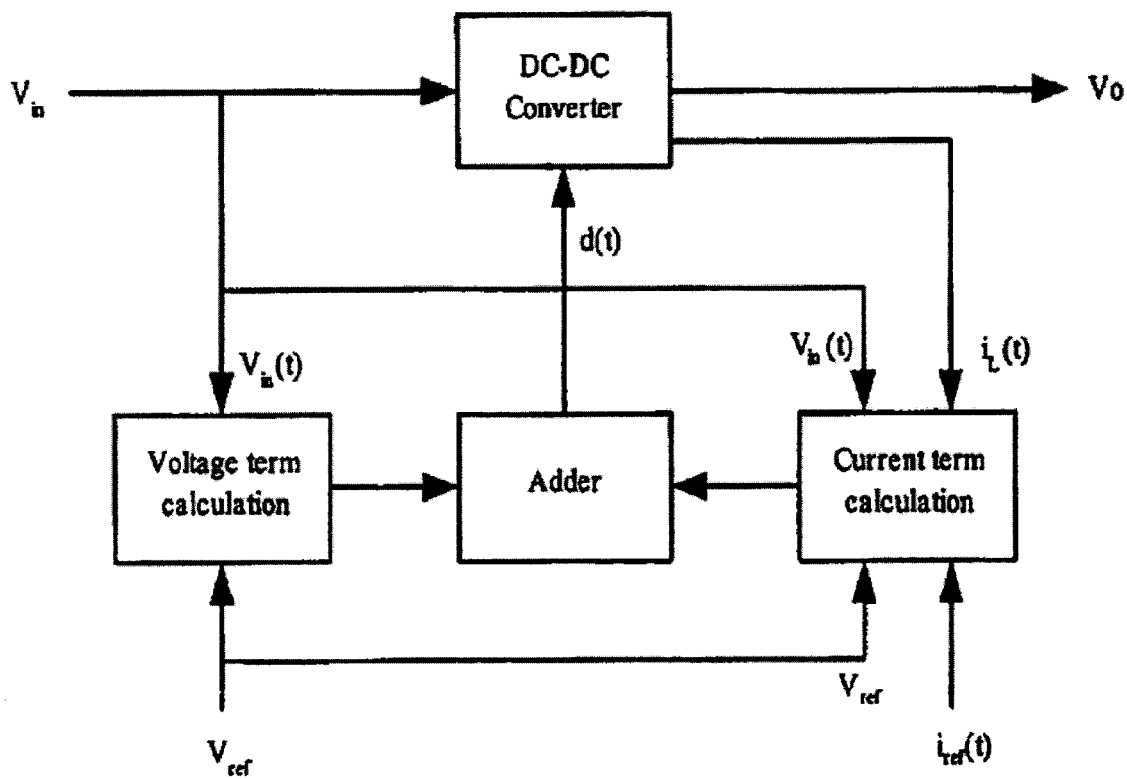
FIG. 6 is a general block diagram of parallel current mode control.

FIG. 6 provides the general block diagram of the parallel current mode control. In FIG. 6, $V_{in}(t)$ represents the sensed input voltage. $i_L(t)$ represents the sensed inductor current. $i_{ref}(t)$ represents the reference current. $V_{ref}$ represents the reference output voltage. The duty cycle d(t) is determined by the sum of outputs of voltage and current term calculation. The voltage and current term calculation algorithm depend on the specific converter topology.

2. Closed Loop Implementation of Parallel Current Mode Control

Figure 7:
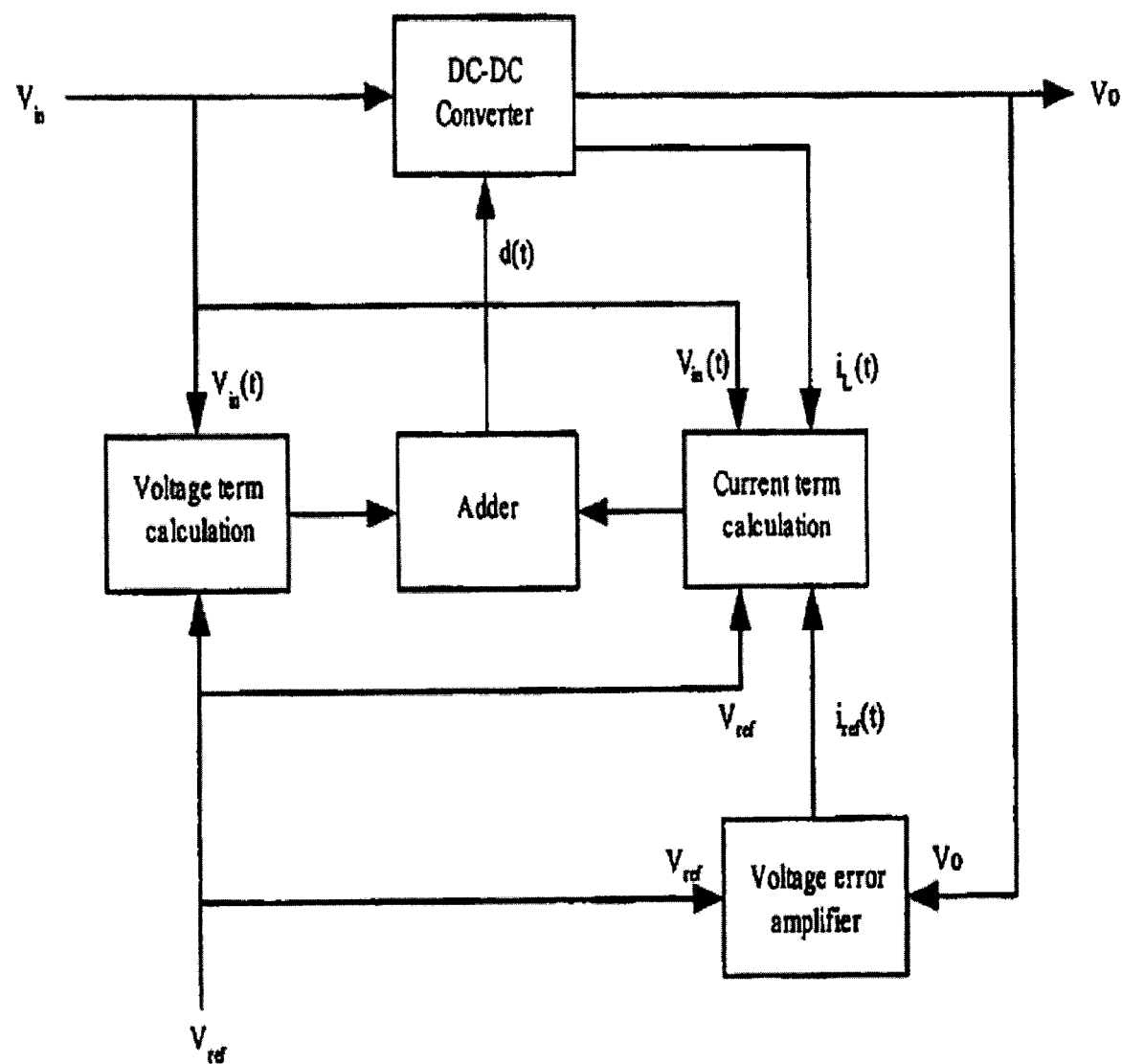
FIG. 7 is a block diagram of parallel current mode control for closed loop operation.

Closed loop operation is required in order to regulate the output voltage tightly. The closed loop implementation of the parallel current mode control is illustrated in FIG. 7. The output voltage is sensed and fed into the voltage error amplifier. The reference voltage is also fed into the voltage error amplifier. The output of the voltage error amplifier is the reference current. Under closed loop operation, if the output voltage is lower than the reference voltage, the output of the voltage error amplifier will be increased and thus the inductor current value will be increased and then the output voltage will be increased to the reference voltage.

FIG. 7 is a general block diagram. The control algorithms can be implemented using digital circuits. They can also be implemented using analog circuits.

This section provides the detailed implementation of parallel current mode control using digital implementation and sampling the inductor current at the beginning of switching period. Digital control is, by its nature, a discrete control. This means that samples of inductor current, input voltage, output voltage, etc. are normally taken in every switching period. The fact that the inductor current is sampled at the beginning of switching period is significant for digital control. This provides the latest possible information for the controller to decide the required duty cycle for the present switching period.

2.1. Boost Converter Implementation

Figure 8:
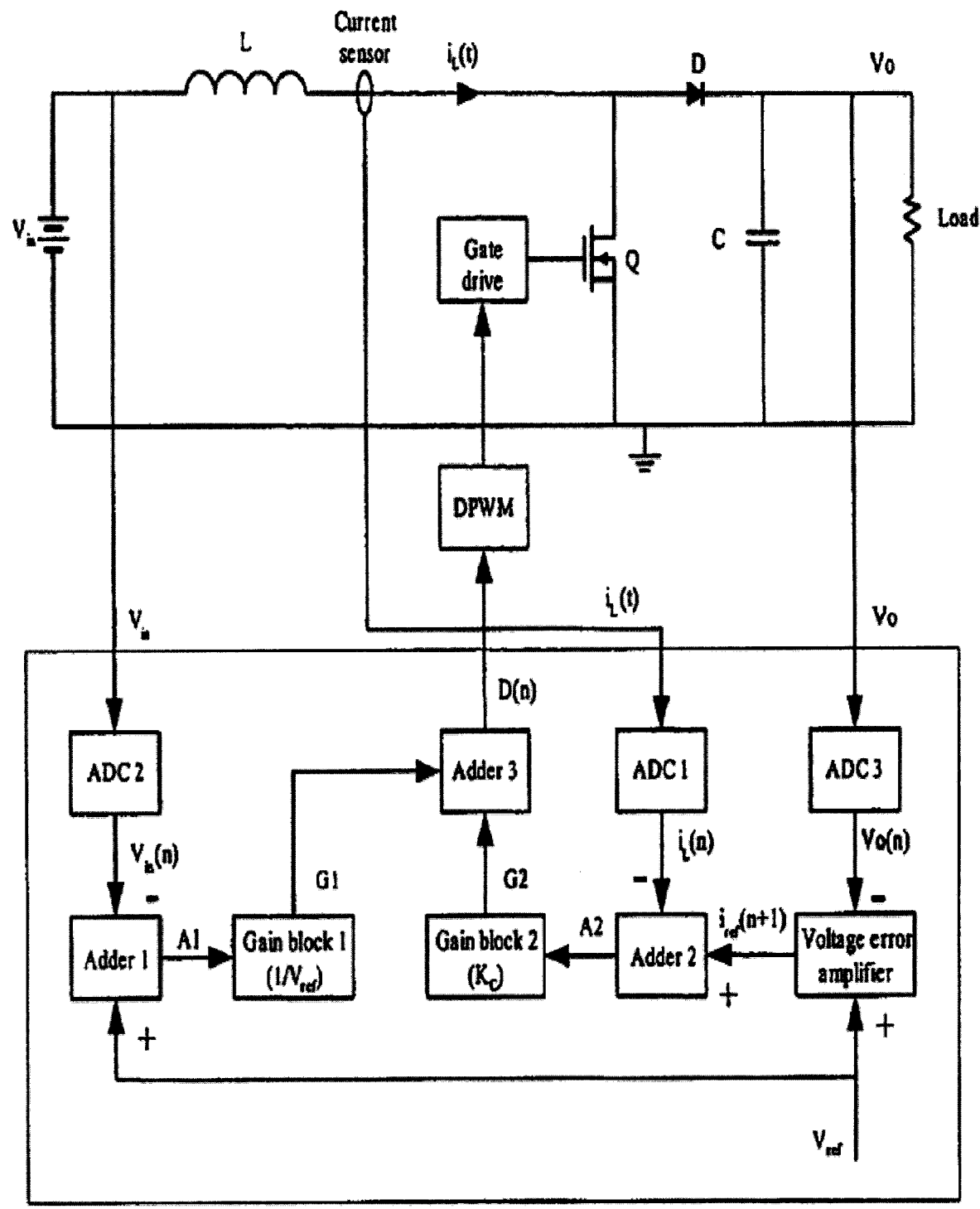
FIG. 8 is a block diagram showing a Boost converter under parallel current mode control.

FIG. 8 illustrates the block diagram for a Boost converter operating under parallel current mode control. The inductor current is sampled at the beginning of every switching period. The analog value of the inductor current is converted into digital value by the ADC 1 (Analog to Digital Converter) at the beginning of the switching period. The analog value of the input voltage is converted into digital value by ADC 2 (Analog to Digital Converter) at the beginning of the switching period. The analog value of the output voltage is converted into digital value by ADC 3. The output voltage is compared with the reference voltage $V_{ref}$ through the voltage error amplifier and its output is used as the reference value for inductor current. The difference between the reference current, $i_{ref}(n+1)$, and the inductor current, $i_L(n)$, is calculated by adder 2. The output of adder 2, A2, is scaled by a constant $K_C$ through gain block 2. From equation (16), the value of $K_C$ is defined as:

$$K_C = L/(T_s * V_{ref}) \tag{21}$$

Adder 2 and gain block 2 perform the current term calculation, as given by equation (16).

The difference between the input voltage and the reference voltage is calculated by adder 1. The output of adder 1, A1, is scaled by a constant, $1/V_{ref}$, through gain block 2. Adder 1 and gain block 1 perform the voltage term calculation as given by equation (15). The output of these two gain blocks, G1 and G2, are added together by adder 3 to generate the required duty cycle D(n). D(n) is a digital value corresponding to the required duty cycle. This digital value is converted into required pulse width through DPWM (Digital Pulse Width Modulation block). The output of the DPWM is fed into the gate drive block to turn on and turn off the MOSFET effectively.

It should be noted that the implementations shown in FIG. 8 may not the best way to implement the control strategy of parallel current mode control for Boost converter as defined by equations (14), (15) and (16). It is conceivable that better implementation methods could be developed by a person skilled in the art.

2.2. Other Converter Implementation

The implementation for other converters, such as Buck, Buck-Boost, etc., can be implemented in the same way, as will be obvious to anyone skilled in the art.

2.3. Analog Implementation

Although the proposed parallel current mode control is optimized for digital implementation. It can also be implemented by analog circuits.

2.3.1. Analog Control Algorithms for Parallel Current Mode Control

The control algorithms for parallel current mode control are expressed in digital format. The analog expression of the parallel current mode control can be derived. From equations (6.1), (7.1), and (8.1), the analog algorithms for Buck-Boost converter under parallel current mode control can be derived as:

$$d(t) = \frac{duty\_V_{buck\_boost}(V) + duty\_V_{buck\_boost}(I)}{V_{in}(t) + V_{ref}} \tag{22}$$

$$duty\_V_{buck\_boost}(V) = V_{ref} \tag{23}$$

$$duty\_V_{buck\_boost}(I) = \frac{L}{T_s} \cdot [i_{ref}(t) - i_L(t)] \tag{24}$$

Similarly, the analog algorithms for Boost converter under parallel current mode control can be derived from equations (14), (15), and (16) as following:

$$d(t) = duty_{boost}(V) + duty_{boost}(I) \tag{25}$$

$$duty_{boost}(V) = \frac{V_{ref} - V_{in}(t)}{V_{ref}} \tag{26}$$

$$duty_{boost}(I) = \frac{L}{T_s \cdot V_{ref}} \cdot [i_{ref}(t) - i_L(t)] \tag{27}$$

The analog algorithms for other converters can also be derived in the same way.

2.3.2. Analog Implementation

Figure 9:
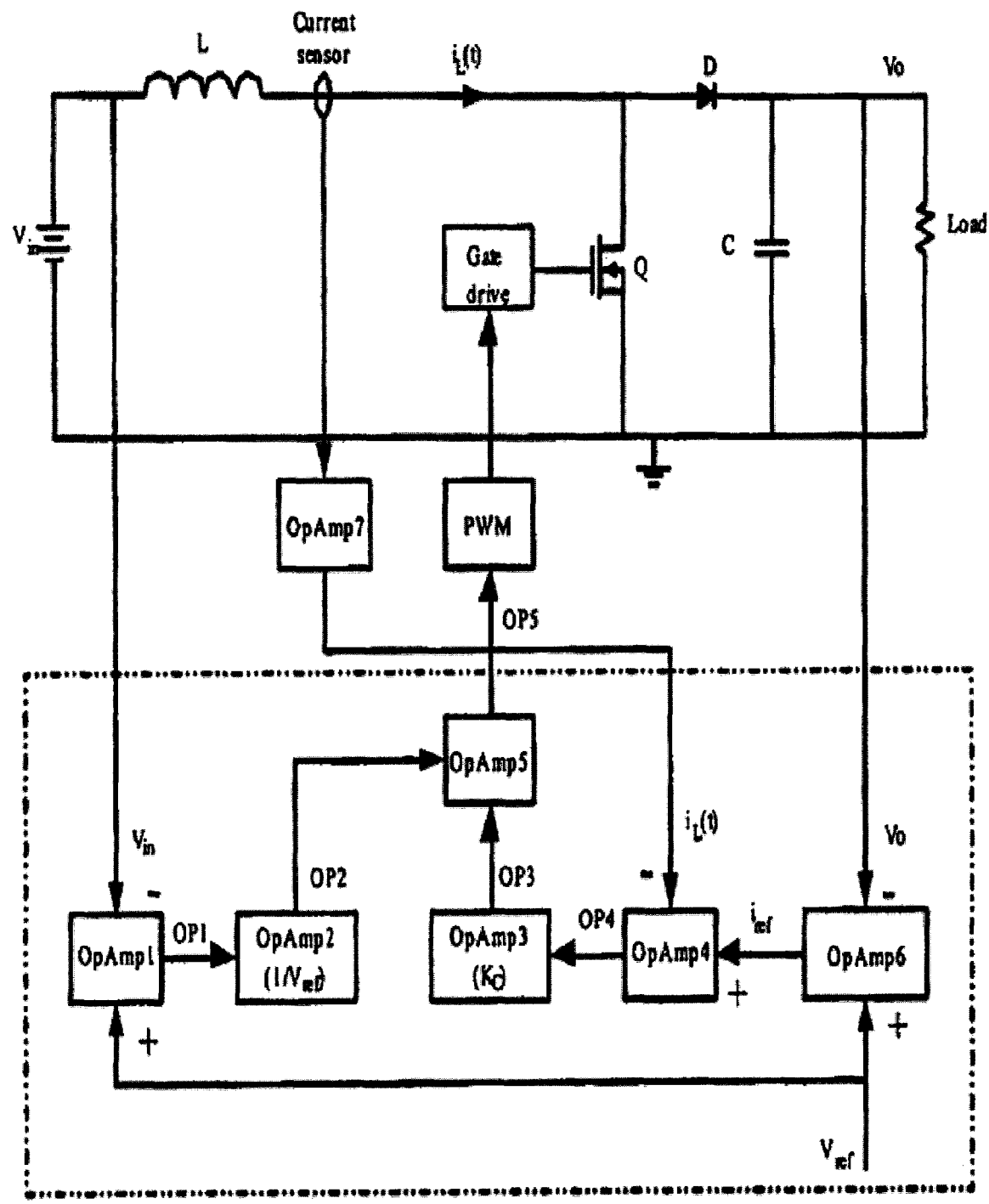
FIG. 9 is a block diagram showing analog implementation of parallel current mode control for Boost converter.

FIG. 9 illustrates the block diagram of the analog implementation of parallel current mode control for Boost converter. Operational Amplifier 1 (OpAmp1) generates the difference between reference voltage and input voltage. OpAmp2 performs the scale operation to obtain the voltage term in equation (26). OpAmp6 is the voltage error amplifier to amplify the difference between the output voltage and reference voltage. Its output is the reference current for inductor current. OpAmp7 is a low pass filter which effectively calculates the inductor current. OpAmp4 calculates the difference between the reference current and inductor current. OpAmp3 performs the scale operation to obtain the current term in equation (27). The output of voltage term calculation (OP2) and current term calculation (OP3) are added together to get the duty cycle signal by OpAmp5. OP5 is a voltage signal corresponding to the required duty cycle. This signal is converted into pulse width through a Pulse Width Modulator (PWM). The output of PWM is fed into the gate drive circuit to turn on and turn off the MOSFET effectively.

It should be noted that in practice, some of the OpAmps could be combined.

Similarly, the analog implementation for other converters under parallel current mode control can also be developed by a person skilled in the art. The details are not presented here.

2.4. Parallel Current Mode Control without Input Voltage Feed Forward

For Buck converter and Buck-Boost converter, the input voltage appears in the denominator of the duty cycle calculation in the parallel current mode control. This input voltage feedforward will improve the dynamic performance. At the time, this also requires a divider in the implementation.

In some cases, where the input voltage does not change quickly, or the dynamic performance for input voltage variation is not critical, the input voltage feedforward is not needed. In these cases, the divider is not needed and a gain block can be used. This will simplify the implementation circuit.

Take the Buck-Boost converter under parallel current mode control as an example. Equations (6.1), (7.1), and (8.1) are the control algorithm. When no input voltage feed forward is needed, the term $V_{in}(n)$ can be replaced by a constant voltage. One value of the constant can be the nominal input voltage, $V_{in\_nom}$. Therefore, the parallel current mode control algorithms for Buck-Boost converter without input voltage feed forward can be derived as:

$$d(n) = K_V \cdot [\text{duty\_V}_{\text{buck\_boost}}(V) + \text{duty\_V}_{\text{buck\_boost}}(I)] \quad (28)$$

$$\text{duty\_V}_{\text{buck\_boost}}(V) = V_{ref} \quad (29)$$

$$\text{duty\_V}_{\text{buck\_boost}}(I) = \frac{L}{T_s} \cdot [i_{ref}(n+1) - i_L(n)] \quad (30)$$

$$K_V = \frac{1}{V_{\text{in\_noms}} + V_{ref}} \quad (31)$$

The parallel current mode control for Buck and other DC-DC converter without input voltage feed forward can also be derived by similar method described above.

3. Parallel Current Mode Control for Power Factor Correction Application

In an AC-DC converter, Power Factor Correction (PFC) is needed in order to meet regulations, such as IEC-1000-3-2 and IEEE-519. In this case, the input ac current is forced to be a sinusoidal wave shape in the same phase with the input voltage. Two terms are used to evaluate how close the ac current is to the ideal sinusoidal. One is defined as Power Factor (PF). The other is defined as Total Harmonic Distortion (THD). When the input current is a pure sinusoidal and in the same phase with the input voltage, the PF is one (1) and THD is zero (0).

3.1. Control Algorithm for Boost Converter to Achieve PFC

Boost converter has been used extensively for power factor correction. The parallel current mode control can be used to control the Boost converter to achieve high power factor with significant advantages over the existing technologies.

Equations (14), (15), and (16), describe the parallel current mode control for DC-DC Boost converter. In order to achieve power factor correction, the reference current, as shown in equation (16), should be a rectified sinusoidal waveform. This means the reference current should be:

$$i_{ref}(n+1) = I_{PK} \cdot |\sin(\omega_{line} \cdot t(n+1))| \quad (32)$$

In the above equation, $I_{PK}$ is the peak value of the sinusoidal waveform. $I_{PK}$ is obtained from the output of the output voltage error amplifier. $\omega_{line}$ is the angular frequency of the line current. $|\sin(\omega_{line} t(n+1))|$ is the rectified line frequency sinusoidal waveform. Substituting equation (32) to equation (16), the parallel current mode control algorithm for Boost topology using in AC-DC converter to achieve power factor correction can be derived as the following equations:

$$d(n) = \text{duty}_{boost}(V) + \text{duty}_{boost}(I) \quad (33)$$

$$\text{duty}_{boost}(V) = \frac{V_{ref} - V_{in}(n)}{V_{ref}} \quad (34)$$

$$\text{duty}_{boost}(I) = \frac{L}{T_s \cdot V_{ref}} \cdot [I_{PK} \cdot |\sin(\omega_{line} \cdot t(n+1))| - i_L(t)] \quad (35)$$

where, different from the parallel current mode control algorithm for Boost converter in DC-DC application, $V_{in}(n)$ in equation (34) is the rectified ac line voltage in AC-DC application with power factor correction.

3.2. Digital Implementation of PFC

Figure 10:
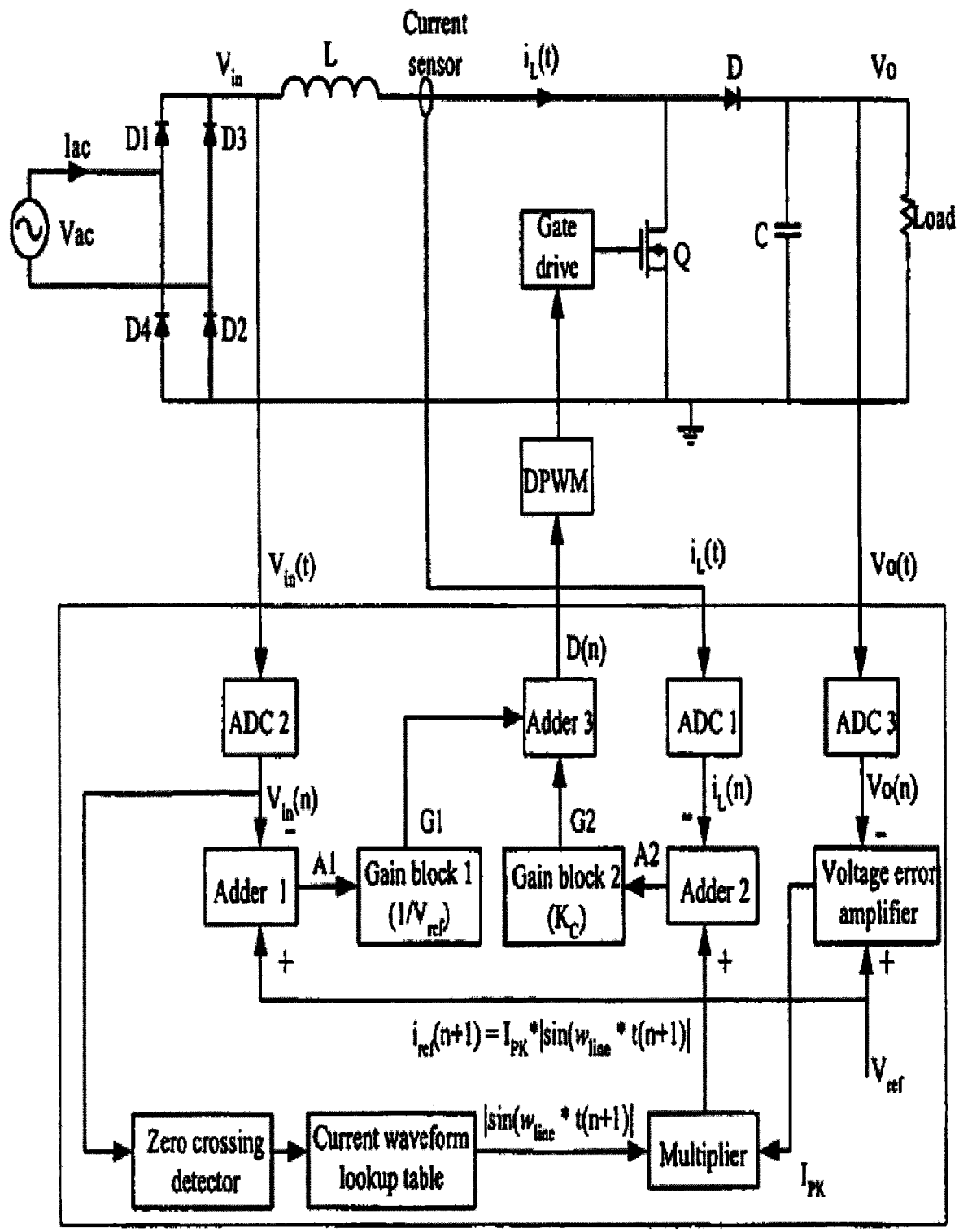
FIG. 10 is a block diagram showing parallel current mode control for PFC using a Boost converter.

FIG. 10 shows the block diagram of parallel current mode control for power factor correction using Boost converter. It is developed based on the block shown in FIG. 8. Following is a list of the difference between FIG. 10 and FIG. 8.

(1) The dc input voltage in FIG. 8 is replaced by the ac input voltage and the diode bridge (D1, D2, D3, and D4).
(2) Three blocks, zero crossing detector, current waveform lookup table and multiplier are added.
(3) The output of the voltage error amplifier is connected to one input of the multiplier as $I_{pk}$ in equation (32). Another input of the multiplier is from the current waveform lookup table as $|\sin(\omega_{line} t(n+1))|$ in equation (32)
(4) The output of the multiplier is connected to the positive input of adder 2 as the reference current $i_{ref}(n+1)$ in equation (32).

The functions of all the other parts are same for FIG. 10 and FIG. 8.

The current waveform lookup table can store the sinusoidal waveform. The zero cross detector and current waveform lookup table are used to generate a rectified sinusoidal waveform with unity peak value. The output of the current waveform lookup table is multiplied together with the output of the voltage error amplifier, $I_{PK}$. The output of the multiplier is a rectified sinusoidal waveform with peak value determined by the output of the error amplifier, $I_{PK}$, and the wave shape decided by the current waveform lookup table. It serves as the reference value for the inductor current. The operation of the other parts of the controller is the same as that in FIG. 8.

The following points should be emphasized:

(1) Sinusoidal waveform lookup table is used to generate a rectified sine wave to determine the wave shape of the reference current. The significant advantage of doing so is that the input ac current can be maintained as sinusoidal even when the input voltage has significant distortion. For example, experimental results have demonstrated that when the input ac voltage is a peak clamped sinusoidal waveform, the input current can still maintain sinusoidal shape.

(2) The current waveform lookup table can also store any arbitrary waveform which can be used in order to force the input ac current follow to that waveform. For example, when a trapezoidal waveform is stored in the current waveform lookup table, the inductor current will be a one-directional trapezoidal waveform, and the input ac current will be bi-directional trapezoidal waveform. The input voltage can still be sinusoidal. One advantage of this arrangement is that the transient response performance under load current change can be improved because more energy can be taken from the source.

(3) A lookup table is but one way to generate the required waveform. Calculation methods can also be used to generate the required waveform for inductor current, and the current waveform lookup table can be replaced by a calculation block.

A simplified way can be used to implement AC-DC converter with power factor correction using Boost converter based on parallel current mode control. In this simplified implementation, the zero crossing detection block and the current waveform lookup table block in FIG. 10 are removed. The digitalized input voltage is fed directly to the multiplier. This can simplify the hardware implementation. The sacrifice is that the THD of the input ac current will depend on the THD of the input ac voltage.

3.2.1. Skipping Inductor Current Sampling

In the above discussion, it is implied that the inductor current is sampled every switching period. It is also feasible that the inductor current be sampled once in every few switching periods. For the switching period when the inductor current is sampled, the actual inductor current is used to calculate the duty cycle. For the switching period when the actual inductor current is not sampled, the estimated inductor current is used to calculate the duty cycle. This is called skipping inductor current sampling.

One advantage of skipping inductor current sampling is reduced sampling requirement. This is especially true when multiphase Boost converter is used for power factor correction. Preliminary test results show that the inductor current skipping can be as high as 16 switching periods. In other words, the THD can still be maintained at very low level when the inductor current is sensed once in every 16 switching period. This is especially good for DSP (Digital Signal Processor) of the proposed control method.

3.3. Analog Implementation

The parallel current mode control for Boost converter can also be implemented by analog circuits. The analog control algorithm for Boost converter can be derived from equations (33), (34) an (35) as following:

$$d(t) = duty_{boost}(V) + duty_{boost}(I) \quad (36)$$

$$duty_{boost}(V) = \frac{V_{ref} - V_{in}(t)}{V_{ref}} \quad (37)$$

$$duty_{boost}(I) = \frac{L}{T_s \cdot V_{ref}} \cdot [I_{PK} \cdot |\sin(\omega_{line} \cdot t)| - i_L(t)] \quad (38)$$

Figure 11:
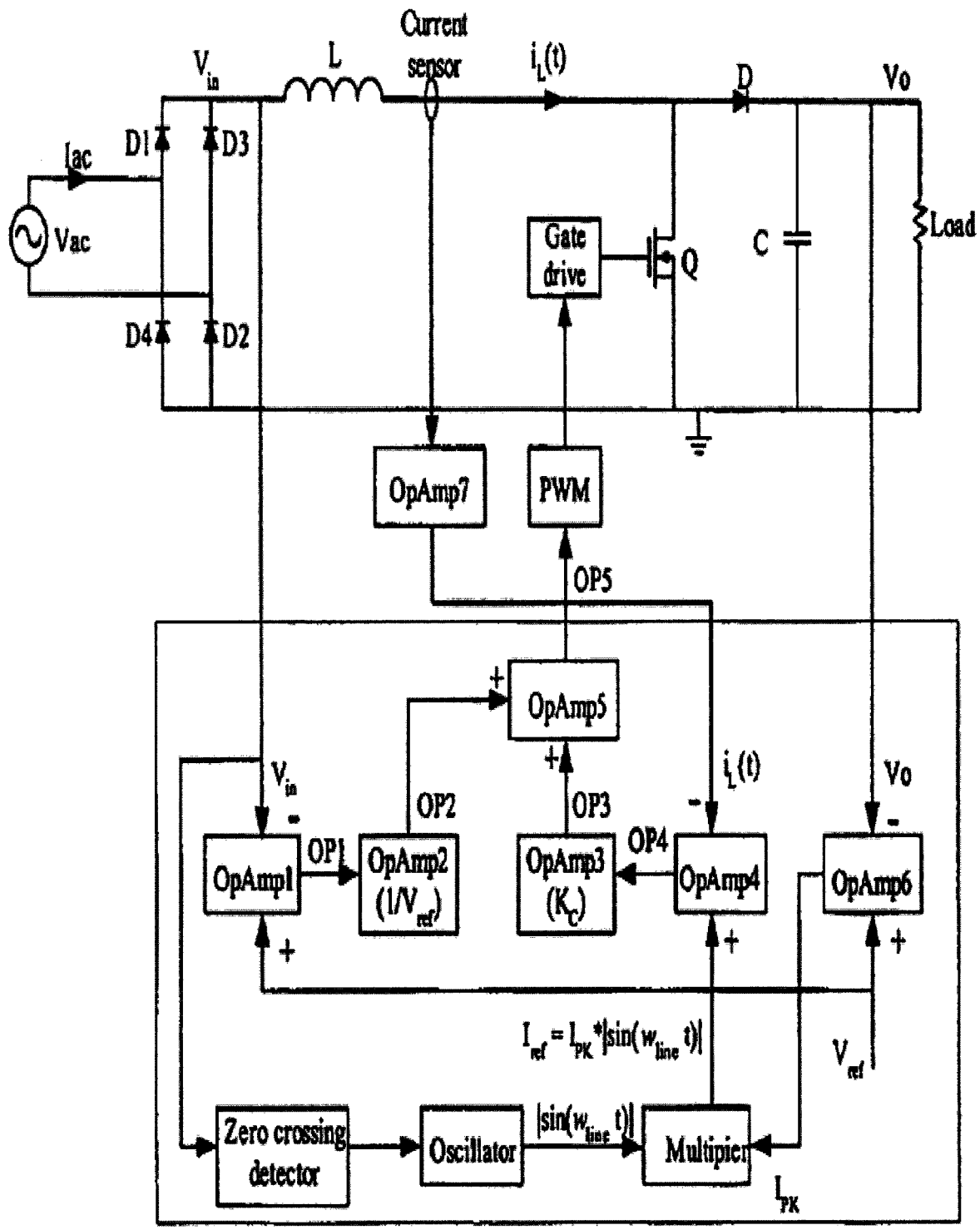
FIG. 11 is a block diagram showing analog implementation of parallel current mode control for PFC using a Boost converter.

FIG. 11 shows the block diagram of analog implementation of parallel current mode control for PFC using Boost converter. It is developed based on the block shown in FIG. 9. Following is a list of the difference between FIG. 11 and FIG. 9.

(1) The dc input voltage in FIG. 9 is replaced by the ac input voltage and the diode bridge (D1, D2, D3, and D4).
(2) Three blocks, zero crossing detector, oscillator, and multiplier are added.
(3) The output of the OpAmp6 is connected to one input of the multiplier as $I_{pk}$ in equation (38). Another input of the multiplier is from the oscillator as $|\sin(\omega_{line}t)|$ in equation (38)
(4) The output of the multiplier is connected to the positive input of OpAmp4 as the reference current.

The functions of all the other parts are same for FIG. 11 and FIG. 9.

The oscillator can generate rectified sinusoidal waveform. The zero cross detector and oscillator are used to generate a rectified sinusoidal waveform with unity peak value. The oscillator is multiplied together with the output of the OpAmp5 (voltage error amplifier), $I_{PK}$. The output of the multiplier is a rectified sinusoidal waveform with peak value determined by the output of OpAmp5, $I_{PK}$, and the wave shape decided by the oscillator. It serves as the reference value for the inductor current. The operation of the other parts of the controller is the same as that in FIG. 9.

The following points should be emphasized:
(1) An oscillator is used to generate a rectified sine wave to determine the wave shape of the reference current. The significant advantage of doing so is that the input ac current can be maintained as sinusoidal even when the input voltage has significant distortion.
(2) An oscillator can also generate other waveform shape which can be used in order to force the input ac current to that waveform. For example, when the oscillator generates a trapezoidal waveform, the inductor current will be a one-directional trapezoidal waveform, and the input ac current will be bi-directional trapezoidal waveform. The input voltage can still be sinusoidal. One advantage of this arrangement is that the transient response performance under load current change can be improved because more energy can be taken from the source.

Figure 12:
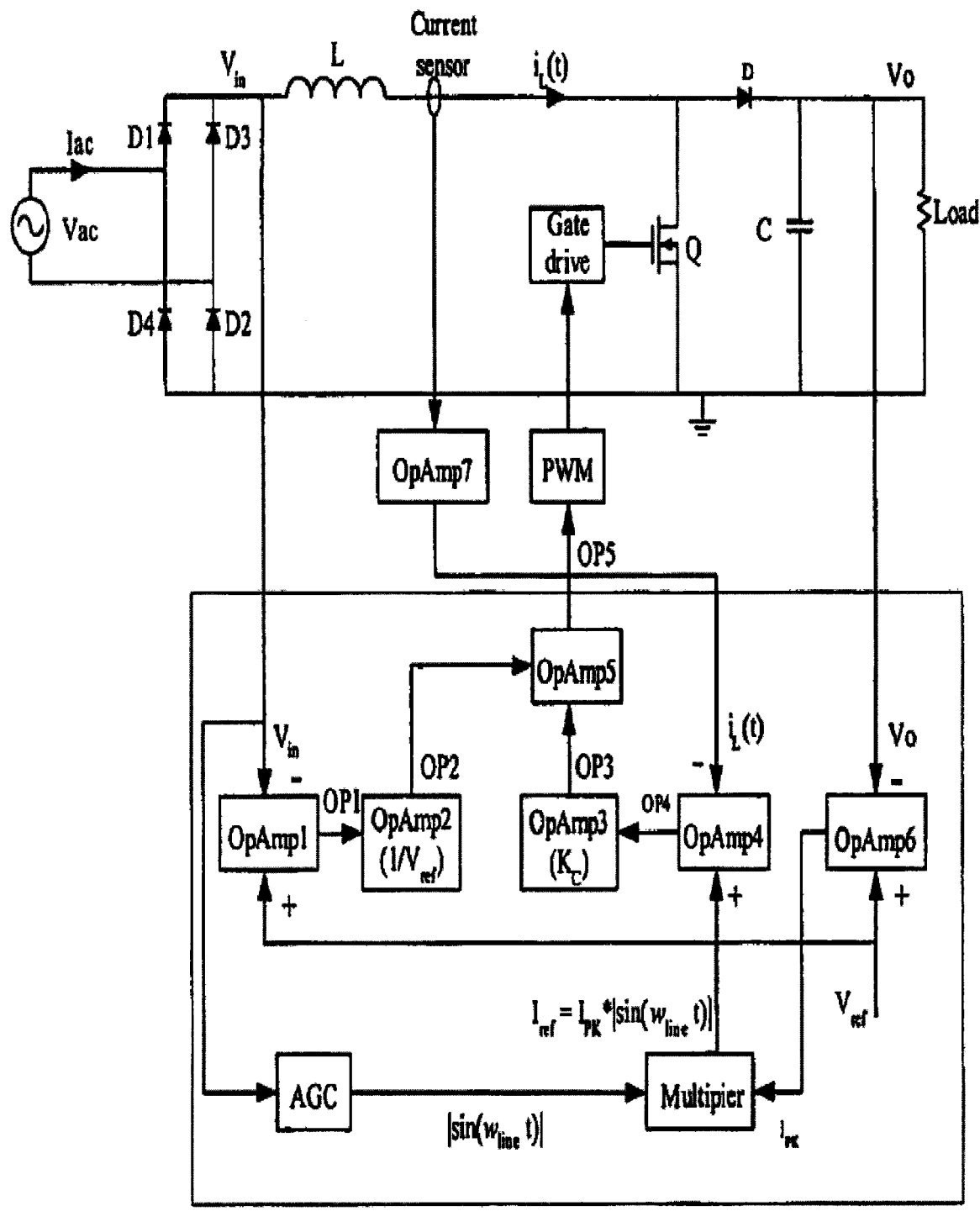
FIG. 12 is a block diagram showing analog implementation using Automatic Gain Control.

The zero crossing detector and the oscillator can be replaced by an Automatic Gain Control (AGC), as shown in FIG. 12. AGC is used to generate a rectified sinusoidal waveform with fixed peak value. With this arrangement, the harmonic component in ac voltage waveform will also introduce harmonic component in ac current.

Figure 13:
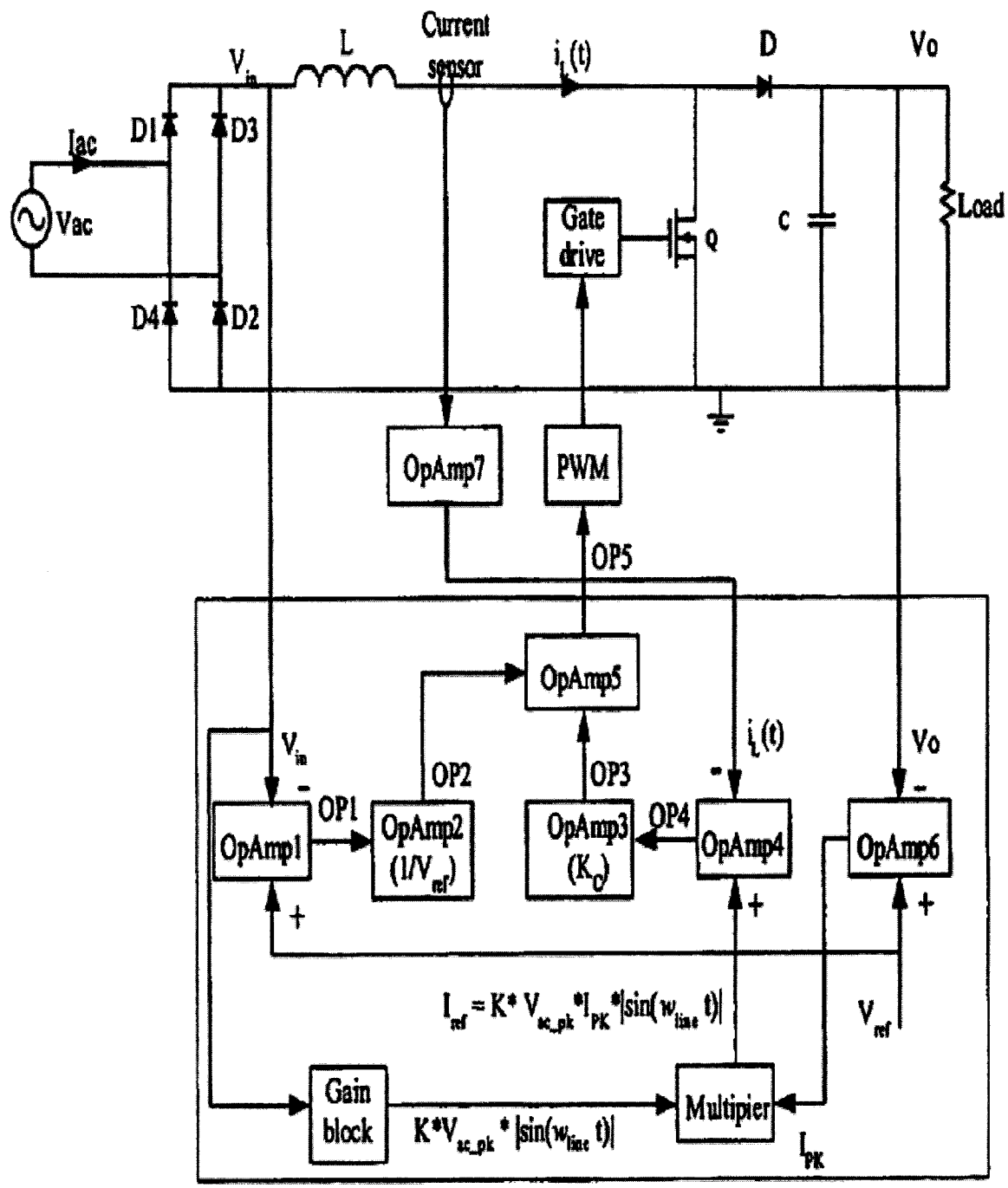
FIG. 13 is a block diagram showing a simplified analog implementation without Automatic Gain control.

FIG. 12 can be further simplified by replacing AGC with a gain block, as shown in FIG. 13. The gain block can be implemented by a resistor divider. With this implementation, the input voltage is scaled down and fed directly into the multiplier. This will simplify the hardware implementation circuit. The drawback is that the output voltage will be more sensitive to input voltage change.

The invention claimed is:

1. A method of controlling output voltage under steady and transient state conditions in an electronic DC-DC power supply converter system based on Buck, Forward, Push-Pull, Half Bridge, Full-Bridge topologies, comprising:
    (a) determining input voltage ($V_{in}$(n)) and reference output voltage ($V_{ref}$) in said system,
    (b) determining reference input current ($i_{ref}$(n+1)), actual inductor current ($i_L$(n)) in said system, and
    (c) controlling a duty cycle (d(n)) in said system according to the algorithm $$d(n) = \frac{L}{T_s} \cdot \frac{i_{ref}(n+1) - i_L(n)}{K \cdot V_{in}(n)/N} + \frac{V_{ref}}{K \cdot V_{in}(n)/N}$$

where L is inductor value, $T_s$ is switching period, where K=1 for Buck, Forward, Push-Pull and Full-Bridge converters and K=0.5 for Half-Bridge converter, where N is transformer turns ratio for Forward, Half Bridge, Full-Bridge, and Push-Pull converters, N=1 for Buck converter,
    so as to provide the output voltage approaching the reference output voltage.

2. A method for controlling a DC-DC power supply converter with a Forward, Push-Pull, Half-Bridge, or Full-Bridge topology, the DC-DC power supply converter including an inductor coupled between an input DC voltage and an output DC voltage and a switch controlling an inductor current through the inductor, the method comprising:
    (a) determining a first term in a first switching period at least based upon an input DC voltage in a first switching period and a reference output voltage;
    (b) determining a second term in the first switching period at least based upon a current difference between a predetermined reference input current for a second switching period subsequent to the first switching period and an actual inductor current of the inductor sampled in the first switching period, and the input DC voltage in the first switching period; and
    (c) determining a duty cycle of the switch for the first switching period by at least adding the first term determined in the first switching period to the second term determined in the first switching period.

3. The method of claim 2, wherein the first term comprises $$\frac{V_{ref}}{K \cdot V_{in}(n)/N},$$

and the second term comprises $$\frac{L}{T_s} \frac{i_{ref}(n+1) - i_L(n)}{K \cdot V_{in}(n)/N},$$

where $V_{ref}$ is the reference output voltage, K is a parameter indicating a topology of the power supply converter (K=1 for the Forward, Push-Pull and Full Bridge topology, and K=0.5 for the Half-Bridge topology), $V_{in}(n)$ is the input DC voltage in the first switching period, N is a ratio of windings in the transformer, L is an inductance of the inductor, $T_s$ is a switching period, $i_{ref}(n+1)$ is the predetermined reference input current for the second switching period, and $i_L(n)$ is the actual inductor current sampled in the first switching period.

4. The method of claim 2, wherein the reference input current has a rectified sinusoidal waveform and is in phase with the input DC voltage.

5. The method of claim 4, wherein the rectified sinusoidal waveform is derived from an oscillator.

6. The method of claim 4, wherein the rectified sinusoidal waveform is derived from an automatic gain controller that generates the rectified sinusoidal waveform from the input DC voltage.

7. The method of claim 4, wherein the rectified sinusoidal current waveform is derived from a gain block with input from the input DC voltage.

8. The method of claim 2, wherein the reference input current is derived from a current waveform lookup table storing values corresponding to a wave shape of the reference input current.

9. The method of claim 2, wherein determining the first term and determining the second term are performed by an analog circuit.

10. A method for controlling a DC-DC power supply converter with a Buck topology, the DC-DC power supply converter including an inductor coupled between an input DC voltage and an output DC voltage and a switch controlling an inductor current through the inductor, the method comprising:

(a) determining a first term in a first switching period at least based upon an input DC voltage in a first switching period and a reference output voltage;

(b) determining a second term in the first switching period at least based upon a current difference between a predetermined reference input current for a second switching period subsequent to the first switching period and an actual inductor current of the inductor sampled in the first switching period, and the input DC voltage in the first switching period; and (c) determining a duty cycle of the switch for the first switching period by at least adding the first term determined in the first switching period to the second term determined in the first switching period.

11. The method of claim 10, wherein the first term comprises $$\frac{V_{ref}}{V_{in}(n)},$$

and the second term comprises $$\frac{L}{T_s} \frac{i_{ref}(n+1) - i_L(n)}{V_{in}(n)},$$

where $V_{ref}$ is the reference output voltage, $V_{in}(n)$ is the input DC voltage in the first switching period, L is an inductance of the inductor, $T_s$ is a switching period, $i_{ref}(n+1)$ is the predetermined reference input current for the second switching period, and $i_L(n)$ is the actual inductor current sampled in the first switching period.

12. The method of claim 10, wherein the reference input current has a rectified sinusoidal waveform and is in phase with the input DC voltage.

13. The method of claim 12, wherein the rectified sinusoidal waveform is derived from an oscillator.

14. The method of claim 12, wherein the rectified sinusoidal waveform is derived from an automatic gain controller that generates the rectified sinusoidal waveform from the input DC voltage.

15. The method of claim 12, wherein the rectified sinusoidal current waveform is derived from a gain block with input from the input DC voltage.

16. The method of claim 10, wherein the reference input current is derived from a current waveform lookup table storing values corresponding to a wave shape of the reference input current.

17. The method of claim 10, wherein determining the first term and determining the second term are performed by an analog circuit.

18. A method for controlling a DC-DC power supply converter with a Buck-Boost topology, the DC-DC power supply converter including an inductor coupled between an input DC voltage and an output DC voltage and a switch controlling an inductor current through the inductor, the method comprising:

(a) determining a first term in a first switching period at least based upon an input DC voltage in a first switching period and a reference output voltage;

(b) determining a second term in the first switching period at least based upon a current difference between a predetermined reference input current for a second switching period subsequent to the first switching period and an actual inductor current of the inductor sampled in the first switching period, the input DC voltage in the first switching period, and the reference output voltage; and (c) determining a duty cycle of the switch for the first switching period by at least adding the first term determined in the first switching period to the second term determined in the first switching period.

19. The method of claim 18, wherein the first term comprises $$\frac{V_{ref}}{V_{in}(n) + V_{ref}},$$

and the second term comprises $$\frac{L}{T_s} \frac{i_{ref}(n+1) - i_L(n)}{V_{in}(n) + V_{ref}},$$

where $V_{ref}$ is the reference output voltage, $V_{in}(n)$ is the input DC voltage in the first switching period, L is an inductance of the inductor, $T_s$ is a switching period, $i_{ref}(n+1)$ is the predetermined reference input current for the second switching period, and $i_L(n)$ is the actual inductor current sampled in the first switching period.

20. The method of claim 18, wherein the reference input current has a rectified sinusoidal waveform and is in phase with the input DC voltage.

21. The method of claim 20, wherein the rectified sinusoidal waveform is derived from an oscillator.

22. The method of claim 20, wherein the rectified sinusoidal waveform is derived from an automatic gain controller that generates the rectified sinusoidal waveform from the input DC voltage.

23. The method of claim 20, wherein the rectified sinusoidal current waveform is derived from a gain block with input from the input DC voltage.

24. The method of claim 18, wherein the reference input current is derived from a current waveform lookup table storing values corresponding to a wave shape of the reference input current.

25. The method of claim 18, wherein determining the first term and determining the second term are performed by an analog circuit.

26. A method for controlling a DC-DC power supply converter with a Boost topology, the DC-DC power supply converter including an inductor coupled between an input DC voltage and an output DC voltage and a switch controlling an inductor current through the inductor, the method comprising:
  (a) determining a first term in a first switching period at least based upon a voltage difference between a reference output voltage and the input DC voltage in the first switching period, and the reference output voltage;
  (b) determining a second term in the first switching period at least based upon a current difference between a predetermined reference input current for a second switching period subsequent to the first switching period and an actual inductor current of the inductor sampled in the first switching period, and the reference output voltage, the second term being determined in parallel with the first term; and
  (c) determining a duty cycle of the switch for the first switching period by at least adding the first term determined in the first switching period to the second term determined in the first switching period.

27. The method of claim 26, wherein the first term comprises $$\frac{V_{ref} + V_{in}(n)}{V_{ref}},$$

and the second term $$\frac{L}{T_s} \frac{i_{ref}(n+1) - i_L(n)}{V_{ref}},$$

comprises where $V_{ref}$ is the reference output voltage, $V_{in}(n)$ is the input DC voltage in the first switching period, L is an inductance of the inductor, $T_s$ is a switching period, $i_{ref}(n+1)$ is the predetermined reference input current for the second switching period, and $i_L(n)$ is the actual inductor current sampled in the first switching period.

28. The method of claim 26, wherein the reference input current has a rectified sinusoidal waveform and is in phase with the input DC voltage.

29. The method of claim 28, wherein the rectified sinusoidal waveform is derived from an oscillator.

30. The method of claim 28, wherein the rectified sinusoidal waveform is derived from an automatic gain controller that generates the rectified sinusoidal waveform from the input DC voltage.

31. The method of claim 28, wherein the rectified sinusoidal current waveform is derived from a gain block with input from the input DC voltage.

32. The method of claim 26, wherein the reference input current is derived from a current waveform lookup table storing values corresponding to a wave shape of the reference input current.

33. The method of claim 26, wherein determining the first term and determining the second term are performed by an analog circuit.

* * * * *

UNITED STATES PATENT AND TRADEMARK OFFICE
CERTIFICATE OF CORRECTION

PATENT NO. : 7,514,913 B2  Page 1 of 1
APPLICATION NO. : 11/951228
DATED : April 7, 2009
INVENTOR(S) : Wanfeng Zhang et al.

It is certified that error appears in the above-identified patent and that said Letters Patent is hereby corrected as shown below:

In claim 1, Column 16, Line 43, replace "Half Bridge" with --Half-Bridge--.

In claim 27, Column 20, Line 13, replace $\dfrac{V_{ref}+V_{in}(n)}{V_{ref}}$ " " with $\dfrac{V_{ref}-V_{in}(n)}{V_{ref}}$ -- --.

In claim 27, Column 20, Line 22, please delete "comprises" before "where $V_{ref}$".

Signed and Sealed this

Thirtieth Day of June, 2009

JOHN DOLL
*Acting Director of the United States Patent and Trademark Office*